United States Patent
Sun et al.

(10) Patent No.: US 11,728,924 B2
(45) Date of Patent: Aug. 15, 2023

(54) ENHANCED BANDWIDTH PUNCTURING

(71) Applicant: QUALCOMM Incorporated, San Diego, CA (US)

(72) Inventors: Yanjun Sun, San Diego, CA (US); Alfred Asterjadhi, San Diego, CA (US); George Cherian, San Diego, CA (US); Abhishek Pramod Patil, San Diego, CA (US); Sai Yiu Duncan Ho, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/473,186

(22) Filed: Sep. 13, 2021

(65) Prior Publication Data

US 2022/0085910 A1     Mar. 17, 2022

Related U.S. Application Data

(60) Provisional application No. 63/079,455, filed on Sep. 16, 2020.

(51) Int. Cl.
*H04L 1/00* (2006.01)
*H04W 74/08* (2009.01)
(Continued)

(52) U.S. Cl.
CPC ......... *H04L 1/0013* (2013.01); *H04L 1/1614* (2013.01); *H04L 5/0094* (2013.01); *H04W 74/0816* (2013.01)

(58) Field of Classification Search
None
See application file for complete search history.

(56) References Cited

U.S. PATENT DOCUMENTS

2021/0168864 A1* 6/2021 Seok ................. H04W 74/0816
2021/0345404 A1* 11/2021 Lu ......................... H04L 1/0069
(Continued)

FOREIGN PATENT DOCUMENTS

WO    WO-2019161189 A1    8/2019
WO    WO-2021112585 A1 *  6/2021
WO    WO-2022019830 A1 *  1/2022

OTHER PUBLICATIONS

International Search Report and Written Opinion—PCT/US2021/050178—ISA/EPO—Dec. 21, 2021.
(Continued)

*Primary Examiner* — Saumit Shah
(74) *Attorney, Agent, or Firm* — Holland & Hart / Qualcomm

(57) ABSTRACT

This disclosure provides methods, devices and systems for enhanced bandwidth puncturing. Some implementations more specifically relate to punctured channel indications that support channel puncturing over a range of bandwidths achievable in accordance with the Institute of Electrical and Electronics Engineers (IEEE) 802.11be amendment, and future generations, of the IEEE 802.11 standard. In some implementations, an access point (AP) may communicate static punctured channel information to each associated wireless station (STA) in its BSS. In some other implementations, a transmit opportunity (TXOP) holder may communicate dynamic punctured channel information to a TXOP responder with which it intends to communicate. Still further, in some implementations, the TXOP responder may communicate additional punctured channel information to the TXOP holder responsive to the dynamic punctured channel information.

30 Claims, 14 Drawing Sheets

(51) Int. Cl.
　　　*H04L 5/00*　　　(2006.01)
　　　*H04L 1/1607*　　(2023.01)

(56) References Cited

U.S. PATENT DOCUMENTS

2022/0045725 A1* 2/2022 Seok .................. H04B 7/0417
2022/0045788 A1* 2/2022 Liu ....................... H04L 5/0005
2023/0006770 A1* 1/2023 Park ......................... H04L 1/00

OTHER PUBLICATIONS

Liu, J., (Mediatek): "Efficient EHT Preamble Design," IEEE Draft, 11-20-0439-00-00BE-Efficient-EHT-Preamble-Design, IEEE-SA Mentor, Piscataway, NJ USA, vol. 802.11 EHT, 802.11be, Mar. 13, 2020 (Mar. 13, 2020), XP068167041, pp. 1-10, Retrieved from the Internet: URL: https://mentor.ieee.org/802.11/dcn/20/11-20-0439-00-00be-efficient-eht-preamble-design.pptx [retrieved on Mar. 13, 2020] p. 3-p. 6.

Lochan Verma (Apple): "Channel Width Selection for various Frame Types with Preamble Puncture and Puncture Location Indication", IEEE Draft, 11-20-0591-00-00BE-Channel-Width-Selection -for-Various-Frame-Types-with-Preamble-Puncture-and-Puncture-Location-Indication, IEEE-SA Mentor, Piscataway, NJ USA, vol. 802 .11 EHT, 802.11be Apr. 8, 2020 (Apr. 8, 2020), XP068167413, pp. 1-13, Retrieved from the Internet: URL: https://mentor.ieee.org/802.11/dcn/20/11-20-0591-00-00be-channel-width-selection-for-various-frame-types-with-preamble-puncture-and-puncture-location-indication.pptx, [retrieved on Apr. 8, 2020] the whole document.

Yongho Seok (Mediatek): "EHT RTS and CTS Procedure", IEEE Draft, 11-19-2125-02-00BE-EHT-RTS-and-CTS-Procedure, IEEE-SA Mentor, Piscataway, NJ USA, vol. 802.11 EHT, 802.11be, No. 2, Mar. 19, 2020 (Mar. 19, 2020), XP068167167, pp. 1-17, Retrieved from the Internet: URL: https://mentor.ieee.org/802.11/dcn/19/11-19-2125-02-00be-eht-rts-and-cts-procedure.pptx [retrieved on Mar. 19, 2020] the whole document.

\* cited by examiner

ENHANCED BANDWIDTH PUNCTURING

CROSS-REFERENCE TO RELATED APPLICATIONS

This Patent Applications claims priority to U.S. Provisional Patent Application No. 63/079,455 entitled "ENHANCED BANDWIDTH PUNCTURING" and filed on Sep. 16, 2020, which is assigned to the assignee hereof. The disclosures of all prior Applications are considered part of and are incorporated by reference in this Patent Application.

TECHNICAL FIELD

This disclosure relates generally to wireless communication, and more specifically to enhanced bandwidth puncturing techniques for wireless communication.

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

Channel puncturing is a wireless communication technique which enables a wireless communication device (such as an AP or a STA) to transmit and receive wireless communications over a portion of a wireless channel exclusive of particular subchannels (referred to as "punctured subchannels"). For example, if a wireless communication device detects that a 20 MHz subchannel of a 160 MHz wireless channel is occupied, the wireless communication device can use channel puncturing to avoid communicating over the occupied subchannel while still utilizing the remaining 140 MHz bandwidth. Accordingly, channel puncturing allows a wireless communication device to improve or maximize its throughput by utilizing more of the available spectrum.

New WLAN communication protocols are being developed to enable enhanced WLAN communication features such as, for example, increases in the bandwidth of communications (up to at least 320 MHz). As the bandwidth of the wireless channel increases, the likelihood of interference on one or more subchannels also increases. For example, a wireless communication device in a given BSS may occupy one or more subchannels of a 320 MHz channel used by a wireless communication device in an overlapping BSS (OBSS). Thus, as new WLAN communication protocols enable access to a greater range of bandwidths, new channel puncturing indications are needed to efficiently utilize the newly available spectrum.

SUMMARY

The systems, methods and devices of this disclosure each have several innovative aspects, no single one of which is solely responsible for the desirable attributes disclosed herein.

One innovative aspect of the subject matter described in this disclosure can be implemented as a method of wireless communication. The method may be performed by a wireless communication device, and may include transmitting, to a wireless station (STA), a management frame carrying punctured channel information indicating one or more first punctured subchannels associated with a wireless channel; and communicating with the STA over a portion of the wireless channel that excludes at least the one or more first punctured subchannels.

In some aspects, the punctured channel information may include a bitmap representing a plurality of subchannels associated with the wireless channel, where the one or more first punctured subchannels are indicated by one or more bits, respectively, of the bitmap. In some implementations, each bit of the bitmap may represent a respective 20 MHz subchannel. In some implementations, the bitmap may be carried in a non-legacy operation element of the management frame.

In some aspects, the punctured channel information may include a puncturing mode indication indicating whether a transmit opportunity (TXOP) holder is permitted to indicate one or more second punctured subchannels to a TXOP responder, where the one or more second punctured subchannels are different than the one or more first punctured subchannels. In some implementations, the puncturing mode indication may be carried in a non-legacy capability element of the management frame. In some aspects, the puncturing mode indication may further indicate whether the TXOP responder is permitted to indicate one or more third punctured subchannels to the TXOP holder, where the third punctured subchannels are different than the first punctured subchannels and the second punctured subchannels.

In some aspects, the method may further include receiving, from the STA, a packet carrying dynamic punctured channel information indicating one or more second punctured subchannels that are different than the one or more first punctured subchannels, where the portion of the wireless channel further excludes the one or more second punctured subchannels. In some other aspects, the method may further include performing a clear channel assessment (CCA) operation that indicates one or more second punctured subchannels that are different than the one or more first punctured subchannels; and transmitting, to the STA, a packet carrying dynamic punctured channel information indicating the one or more second punctured subchannels, where the portion of the wireless channel further excludes the one or more second punctured subchannels.

In some aspects, the packet may be a physical layer convergence protocol (PLCP) protocol data unit (PPDU) and the dynamic punctured channel information may be carried in a universal signal field (U-SIG) of the PPDU. In some other aspects, the packet may be a control frame and the dynamic punctured channel information may be carried in a service field of the control frame. In some implementations, the dynamic punctured channel information may include a bitmap representing a plurality of subchannels of the wireless channel, where the one or more second punctured subchannels are indicated by one or more bits, respectively, of the bitmap. In some other implementations, the dynamic punctured channel information may be carried on five bits of the service field having a value that maps to the one or more first punctured subchannels.

Another innovative aspect of the subject matter described in this disclosure can be implemented in a wireless communication device. In some implementations, the wireless communication device may include at least one processor and at least one memory communicatively coupled with the at least one processor and storing processor-readable code. In some implementations, execution of the processor-readable code by the at least one processor causes the wireless communication device to perform operations including transmitting, to a STA, a management frame carrying punctured channel information indicating one or more punctured subchannels associated with a wireless channel; and communicating with the STA over a portion of the wireless channel that excludes at least the one or more punctured subchannels.

Another innovative aspect of the subject matter described in this disclosure can be implemented as a method of wireless communication. The method may be performed by a wireless communication device, and may include receiving, from an access point (AP), a management frame carrying punctured channel information indicating one or more first punctured subchannels associated with a wireless channel; and communicating with the AP over a portion of the wireless channel that excludes at least the one or more first punctured subchannels.

In some aspects, the punctured channel information may include a bitmap representing a plurality of subchannels associated with the wireless channel, where the one or more first punctured subchannels are indicated by one or more bits, respectively, of the bitmap. In some implementations, each bit of the bitmap may represent a respective 20 MHz subchannel. In some implementations, the bitmap may be carried in a non-legacy operation element of the management frame.

In some aspects, the punctured channel information may include a puncturing mode indication indicating whether a TXOP holder is permitted to indicate one or more second punctured subchannels to a TXOP responder, where the one or more second punctured subchannels are different than the one or more first punctured subchannels. In some implementations, the puncturing mode indication may be carried in a non-legacy capability element of the management frame. In some aspects, the puncturing mode indication may further indicate whether the TXOP responder is permitted to indicate one or more third punctured subchannels to the TXOP holder, where the third punctured subchannels are different than the first punctured subchannels and the second punctured subchannels.

In some aspects, the method may further include receiving, from the AP, a packet carrying dynamic punctured channel information indicating one or more second punctured subchannels that are different than the one or more first punctured subchannels, where the portion of the wireless channel further excludes the one or more second punctured subchannels. In some other aspects, the method may further include performing a CCA operation that indicates one or more second punctured subchannels that are different than the one or more first punctured subchannels; and transmitting, to the AP, a packet carrying dynamic punctured channel information indicating the one or more second punctured subchannels, where the portion of the wireless channel further excludes the one or more second punctured subchannels.

In some aspects, the packet may be a PPDU and the dynamic punctured channel information may be carried in a U-SIG field of the PPDU. In some other aspects, the packet may be a control frame and the dynamic punctured channel information may be carried in a service field of the control frame. In some implementations, the dynamic punctured channel information may include a bitmap representing a plurality of subchannels of the wireless channel, where the one or more second punctured subchannels are indicated by one or more bits, respectively, of the bitmap. In some other implementations, the dynamic punctured channel information may be carried on five bits of the service field having a value that maps to the one or more first punctured subchannels.

Another innovative aspect of the subject matter described in this disclosure can be implemented in a wireless communication device. In some implementations, the wireless communication device may include at least one processor and at least one memory communicatively coupled with the at least one processor and storing processor-readable code. In some implementations, execution of the processor-readable code by the at least one processor causes the wireless communication device to perform operations including receiving, from an AP, a management frame carrying punctured channel information indicating one or more punctured subchannels associated with a wireless channel; and communicating with the AP over a portion of the wireless channel that excludes at least the one or more punctured subchannels.

BRIEF DESCRIPTION OF THE DRAWINGS

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

Like reference numbers and designations in the various drawings indicate like elements.

DETAILED DESCRIPTION

Figure 1:
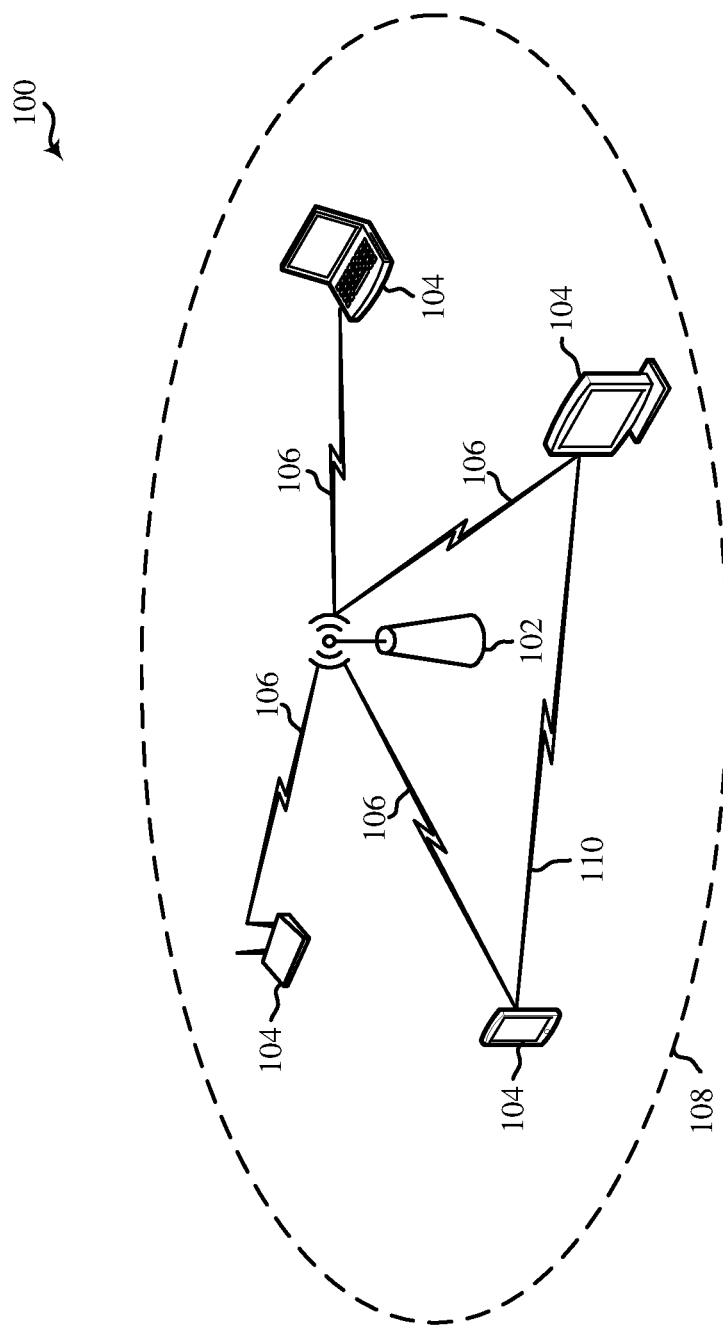
FIG. 1 shows a pictorial diagram of an example wireless communication network.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (JOT) network.

Various implementations relate generally to channel puncturing in wireless communications, and more particularly, to punctured channel indications that support channel puncturing over a range of bandwidths achievable in accordance with the IEEE 802.11be amendment, and future generations, of the IEEE 802.11 standard. In some aspects, an AP may communicate "static" punctured channel information to each of its associated STAs. The static punctured channel information may indicate one or more channels or subchannels that are likely to be busy or otherwise occupied in a relatively constant or consistent manner (such as by devices in an overlapping basic service set (OBSS)). In some other aspects, a transmit opportunity (TXOP) holder may communicate "dynamic" punctured channel information to a TXOP responder. The dynamic punctured channel information may indicate one or more subchannels to be avoided or excluded from communications between the TXOP holder and the TXOP responder (such as in addition to the subchannels indicated by the static punctured channel information). Still further, in some aspects, the TXOP responder may communicate additional punctured channel information to the TXOP holder responsive to the dynamic punctured channel information. The additional punctured channel information may indicate one or more additional subchannels to be avoided or excluded from communications between the TXOP holder and the TXOP responder (such as in addition to the subchannels indicated by the static or dynamic punctured channel information).

Particular implementations of the subject matter described in this disclosure can be implemented to realize one or more of the following potential advantages. By providing static punctured channel information to each device in a given BSS, aspects of the present disclosure may ensure that TXOP holders (and TXOP responders) avoid transmitting wireless communications on portions of a wireless channel that are likely to encounter significant interference. For example, a TXOP holder may puncture one or more subchannels of the wireless channel when transmitting data to a TXOP responder, thereby avoiding interference on the punctured subchannels while still utilizing the remainder of the available spectrum. Aspects of the present disclosure recognize that some channel conditions are likely to change over time, and that the channel conditions perceived by the TXOP holder may be different than the channel conditions perceived by the TXOP responder. For example, the TXOP holder and TXOP responder can each detect which subchannels are occupied at any given time, for example, by performing a clear channel assessment (CCA) on the wireless channel. By providing dynamic punctured channel information to the TXOP responder, the TXOP holder may dynamically update the subchannels to be avoided based on current channel conditions at the time of transmission. By providing additional punctured channel information to the TXOP holder, the TXOP responder may further update the subchannels to be avoided based on current channel conditions at either end of the communication link.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba and 802.11be). The WLAN 100 may include numerous wireless communication devices such as an access point (AP) 102 and multiple stations (STAs) 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 106 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 108 (hereinafter also referred to as a "Wi-Fi link"), or to maintain a communication link 108, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 108.

The APs 102 and STAs 104 may function and communicate (via the respective communication links 108) according to the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 700 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Figure 2A:
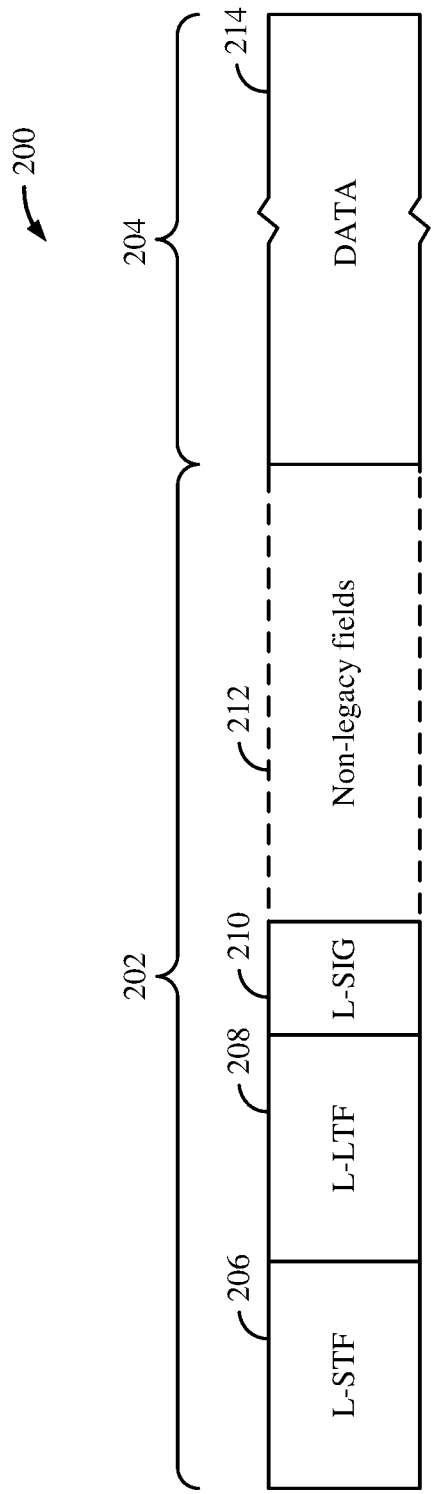
FIG. 2A shows an example protocol data unit (PDU) usable for communications between an access point (AP) and one or more wireless stations (STAs).

FIG. 2A shows an example protocol data unit (PDU) 200 usable for wireless communication between an AP 102 and one or more STAs 104. For example, the PDU 200 can be configured as a PPDU. As shown, the PDU 200 includes a PHY preamble 202 and a PHY payload 204. For example, the preamble 202 may include a legacy portion that itself includes a legacy short training field (L-STF) 206, which may consist of two BPSK symbols, a legacy long training field (L-LTF) 208, which may consist of two BPSK symbols, and a legacy signal field (L-SIG) 210, which may consist of two BPSK symbols. The legacy portion of the preamble 202 may be configured according to the IEEE 802.11a wireless communication protocol standard. In some implementations, the preamble 202 may also include a non-legacy portion including one or more non-legacy fields 212, for example, conforming to an IEEE wireless communication protocol such as the IEEE 802.11ac, 802.11ax, 802.11be or later wireless communication protocol protocols.

The L-STF 206 generally enables a receiving device to perform automatic gain control (AGC) and coarse timing and frequency estimation. The L-LTF 208 generally enables a receiving device to perform fine timing and frequency estimation and also to perform an initial estimate of the wireless channel. The L-SIG 210 generally enables a receiving device to determine a duration of the PDU and to use the determined duration to avoid transmitting on top of the PDU. For example, the L-STF 206, the L-LTF 208 and the L-SIG 210 may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of medium access control (MAC) protocol data units (MPDUs) or an aggregated MPDU (A-MPDU).

Figure 2B:
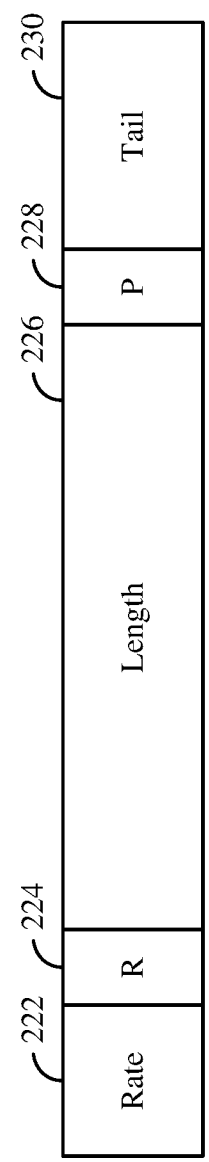
FIG. 2B shows an example field in the PDU of FIG. 2A.

FIG. 2B shows an example L-SIG 210 in the PDU 200 of FIG. 2A. The L-SIG 210 includes a data rate field 222, a reserved bit 224, a length field 226, a parity bit 228, and a tail field 230. The data rate field 222 indicates a data rate (note that the data rate indicated in the data rate field 222 may not be the actual data rate of the data carried in the payload 204). The length field 226 indicates a length of the packet in units of, for example, symbols or bytes. The parity bit 228 may be used to detect bit errors. The tail field 230 includes tail bits that may be used by the receiving device to terminate operation of a decoder (for example, a Viterbi decoder). The receiving device may utilize the data rate and the length indicated in the data rate field 222 and the length field 226 to determine a duration of the packet in units of, for example, microseconds (μs) or other time units.

Figure 3:
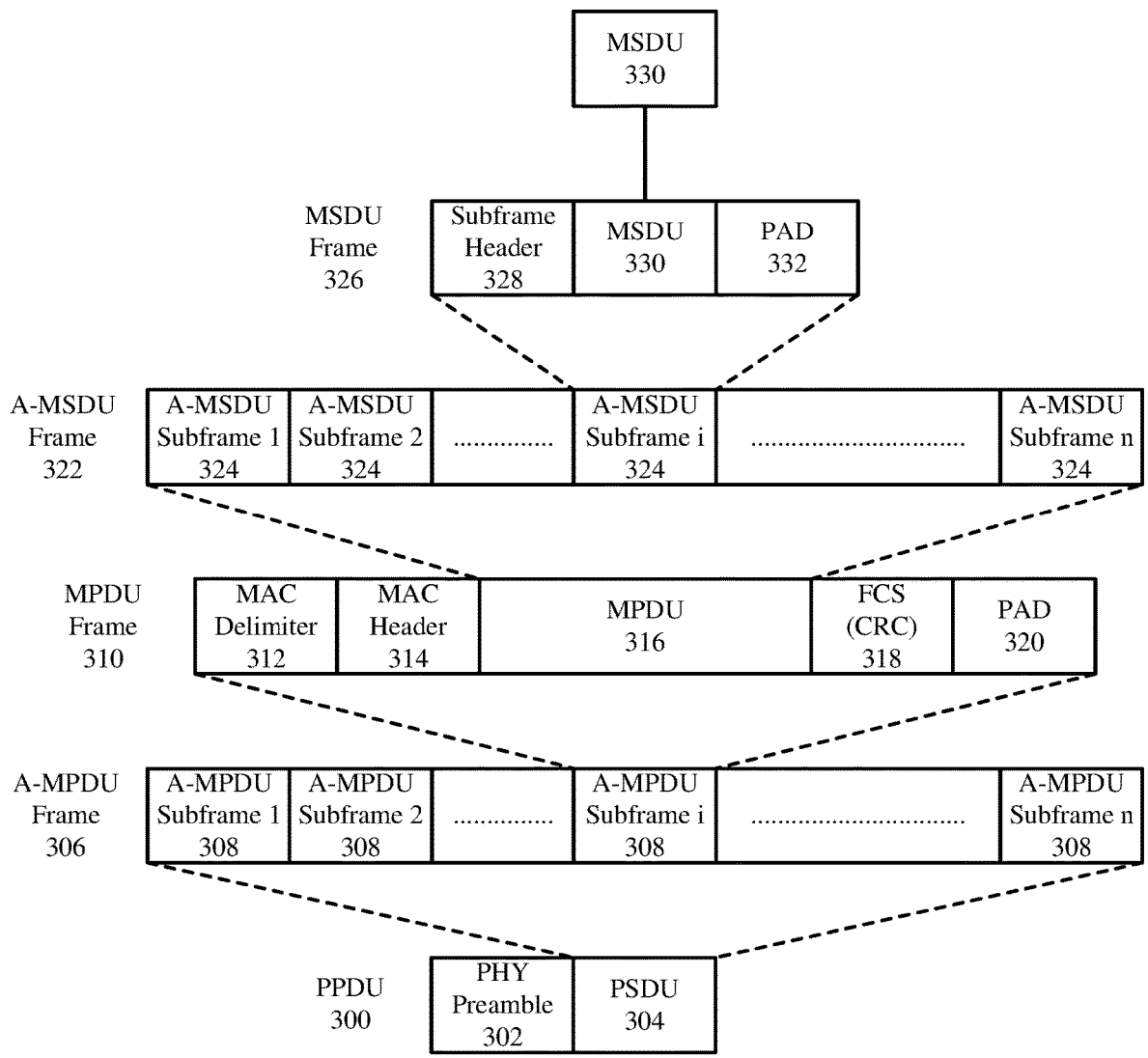
FIG. 3 shows an example physical layer convergence protocol (PLCP) protocol data unit (PPDU) usable for communications between an AP and one or more STAs.

FIG. 3 shows an example PPDU 300 usable for communications between an AP 102 and one or more STAs 104. As described above, each PPDU 300 includes a PHY preamble 302 and a PSDU 304. Each PSDU 304 may represent (or "carry") one or more MAC protocol data units (MPDUs) 316. For example, each PSDU 304 may carry an aggregated MPDU (A-MPDU) 306 that includes an aggregation of multiple A-MPDU subframes 308. Each A-MPDU subframe 306 may include an MPDU frame 310 that includes a MAC delimiter 312 and a MAC header 314 prior to the accompanying MPDU 316, which comprises the data portion ("payload" or "frame body") of the MPDU frame 310. Each MPDU frame 310 may also include a frame check sequence (FCS) field 318 for error detection (for example, the FCS field may include a cyclic redundancy check (CRC)) and padding bits 320. The MPDU 316 may carry one or more MAC service data units (MSDUs) 316. For example, the MPDU 316 may carry an aggregated MSDU (A-MSDU) 322 including multiple A-MSDU subframes 324. Each A-MSDU subframe 324 contains a corresponding MSDU 330 preceded by a subframe header 328 and in some cases followed by padding bits 332.

Referring back to the MPDU frame 310, the MAC delimiter 312 may serve as a marker of the start of the associated MPDU 316 and indicate the length of the associated MPDU 316. The MAC header 314 may include multiple fields containing information that defines or indicates characteristics or attributes of data encapsulated within the frame body 316. The MAC header 314 includes a duration field indicating a duration extending from the end of the PPDU until at least the end of an acknowledgment (ACK) or Block ACK (BA) of the PPDU that is to be transmitted by the receiving wireless communication device. The use of the duration field serves to reserve the wireless medium for the indicated duration, and enables the receiving device to establish its network allocation vector (NAV). The MAC header 314 also includes one or more fields indicating addresses for the data encapsulated within the frame body 316. For example, the MAC header 314 may include a combination of a source address, a transmitter address, a receiver address or a destination address. The MAC header 314 may further include a frame control field containing control information. The frame control field may specify a frame type, for example, a data frame, a control frame, or a management frame.

Figure 4:
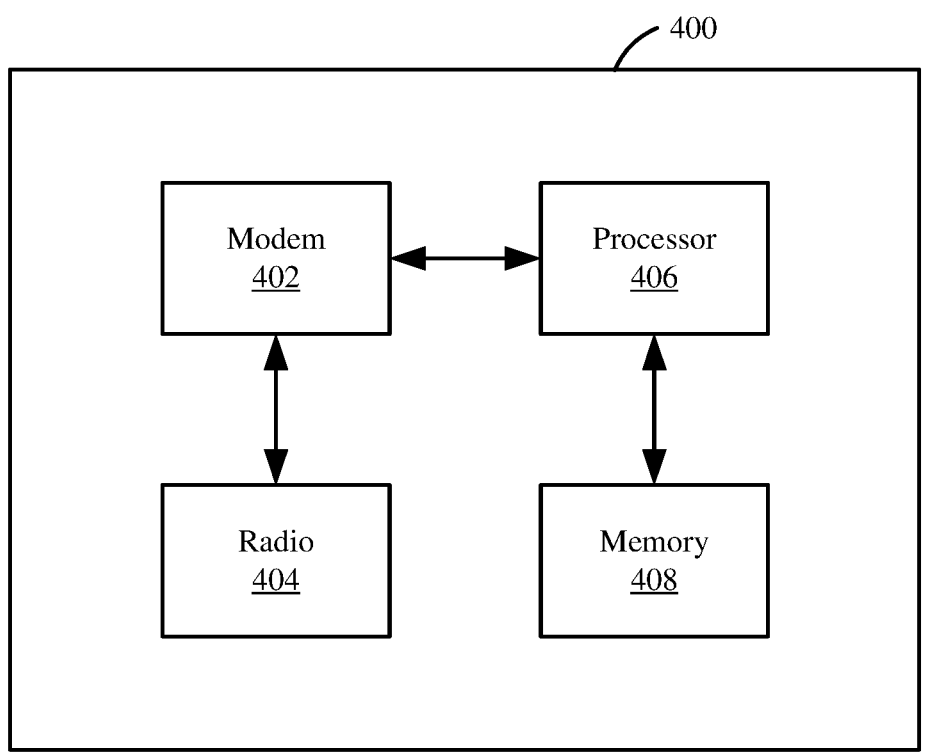
FIG. 4 shows a block diagram of an example wireless communication device.

FIG. 4 shows a block diagram of an example wireless communication device 400. In some implementations, the wireless communication device 400 can be an example of a device for use in a STA such as one of the STAs 104 described with reference to FIG. 1. In some implementations, the wireless communication device 400 can be an example of a device for use in an AP such as the AP 102 described with reference to FIG. 1. The wireless communication device 400 is capable of transmitting (or outputting for transmission) and receiving wireless communications (for example, in the form of wireless packets). For example, the wireless communication device can be configured to transmit and receive packets in the form of physical layer convergence protocol (PLCP) protocol data units (PPDUs) and medium access control (MAC) protocol data units (MPDUs) conforming to an IEEE 802.11 wireless communication protocol standard, such as that defined by the IEEE 802.11-2016 specification or amendments thereof including, but not limited to, 802.11ah, 802.11ad, 802.11ay, 802.11ax, 802.11az, 802.11ba and 802.11be.

The wireless communication device 400 can be, or can include, a chip, system on chip (SoC), chipset, package or device that includes one or more modems 402, for example, a Wi-Fi (IEEE 802.11 compliant) modem. In some implementations, the one or more modems 402 (collectively "the modem 402") additionally include a WWAN modem (for example, a 3GPP 4G LTE or 5G compliant modem). In some implementations, the wireless communication device 400 also includes one or more radios 404 (collectively "the radio 404"). In some implementations, the wireless communication device 406 further includes one or more processors, processing blocks or processing elements 406 (collectively "the processor 406") and one or more memory blocks or elements 408 (collectively "the memory 408").

The modem 402 can include an intelligent hardware block or device such as, for example, an application-specific integrated circuit (ASIC) among other possibilities. The modem 402 is generally configured to implement a PHY layer. For example, the modem 402 is configured to modulate packets and to output the modulated packets to the radio 404 for transmission over the wireless medium. The modem 402 is similarly configured to obtain modulated packets received by the radio 404 and to demodulate the packets to provide demodulated packets. In addition to a modulator and a demodulator, the modem 402 may further include digital signal processing (DSP) circuitry, automatic gain control (AGC), a coder, a decoder, a multiplexer and a demultiplexer. For example, while in a transmission mode, data obtained from the processor 406 is provided to a coder, which encodes the data to provide encoded bits. The encoded bits are then mapped to points in a modulation constellation (using a selected MCS) to provide modulated symbols. The modulated symbols may then be mapped to a number $N_{SS}$ of spatial streams or a number $N_{STS}$ of space-time streams. The modulated symbols in the respective spatial or space-time streams may then be multiplexed, transformed via an inverse fast Fourier transform (IFFT) block, and subsequently provided to the DSP circuitry for Tx windowing and filtering. The digital signals may then be provided to a digital-to-analog converter (DAC). The resultant analog signals may then be provided to a frequency upconverter, and ultimately, the radio 404. In implementations involving beamforming, the modulated symbols in the respective spatial streams are precoded via a steering matrix prior to their provision to the IFFT block.

While in a reception mode, digital signals received from the radio 404 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are then fed to the demultiplexer for demultiplexing. The demultiplexed bits may then be descrambled and provided to the MAC layer (the processor 406) for processing, evaluation or interpretation.

The radio 404 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may, in turn, be coupled to one or more antennas. For example, in some implementations, the wireless communication device 400 can include, or be coupled with, multiple transmit antennas (each with a corresponding transmit chain) and multiple receive antennas (each with a corresponding receive chain). The symbols output from the modem 402 are provided to the radio 404, which then transmits the symbols via the coupled antennas. Similarly, symbols received via the antennas are obtained by the radio 404, which then provides the symbols to the modem 402.

The processor 406 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 406 processes information received through the radio 404 and the modem 402, and processes information to be output through the modem 402 and the radio 404 for transmission through the wireless medium. For example, the processor 406 may implement a control plane and MAC layer configured to perform various operations related to the generation and transmission of MPDUs, frames or packets. The MAC layer is configured to perform or facilitate the coding and decoding of frames, spatial multiplexing, space-time block coding (STBC), beamforming, and OFDMA resource allocation, among other operations or techniques. In some implementations, the processor 406 may generally control the modem 402 to cause the modem to perform various operations described above.

The memory 408 can include tangible storage media such as random-access memory (RAM) or read-only memory (ROM), or combinations thereof. The memory 408 also can store non-transitory processor- or computer-executable software (SW) code containing instructions that, when executed by the processor 406, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 5B:
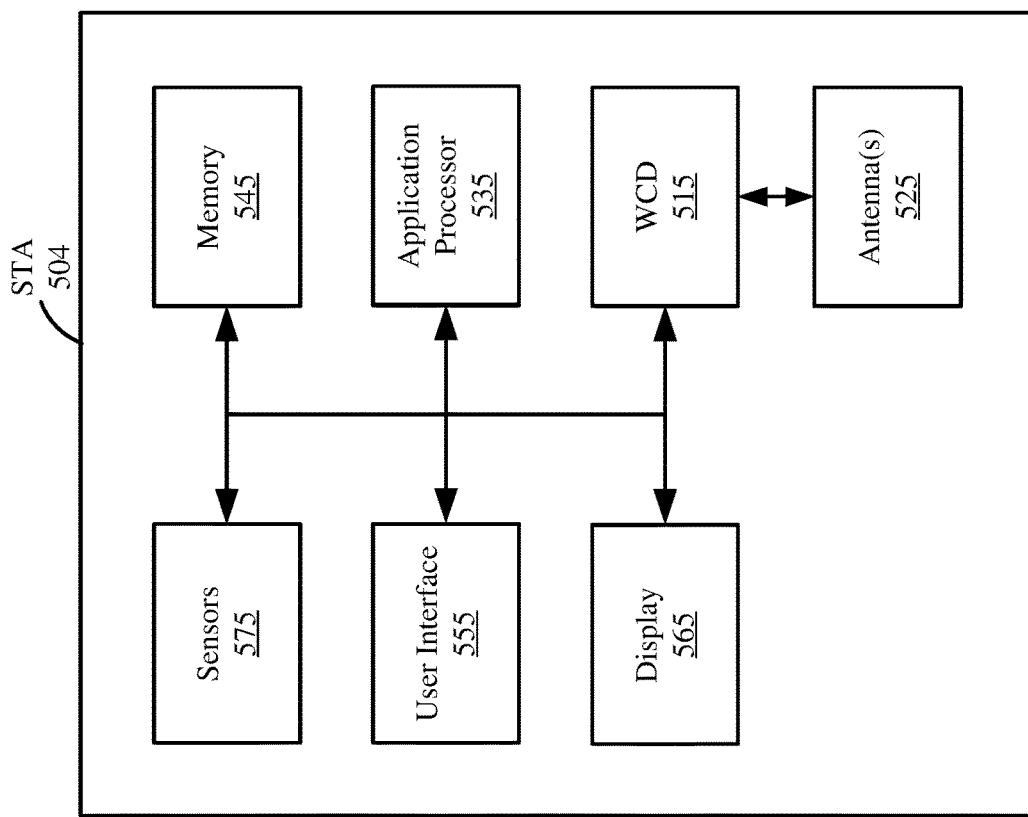
FIG. 5B shows a block diagram of an example STA.
Figure 5A:
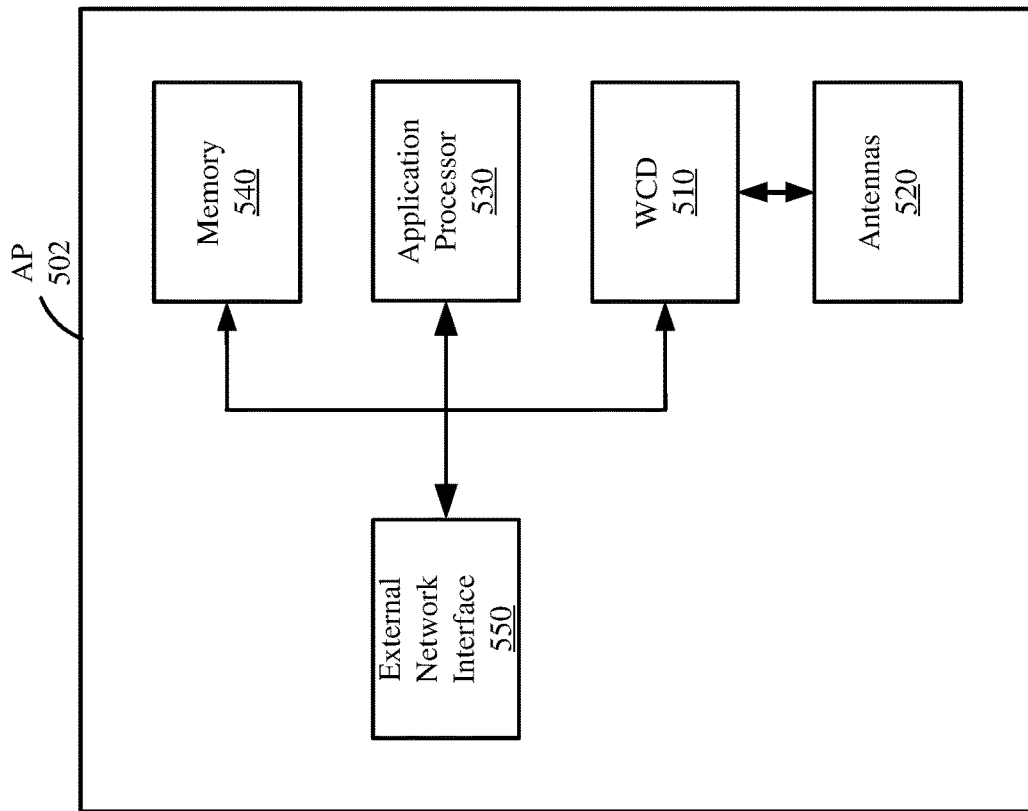
FIG. 5A shows a block diagram of an example AP.

FIG. 5A shows a block diagram of an example AP 502. For example, the AP 502 can be an example implementation of the AP 102 described with reference to FIG. 1. The AP 502 includes a wireless communication device (WCD) 510 (although the AP 502 may itself also be referred to generally as a wireless communication device as used herein). For example, the wireless communication device 510 may be an example implementation of the wireless communication device 400 described with reference to FIG. 4. The AP 502 also includes multiple antennas 520 coupled with the wireless communication device 510 to transmit and receive wireless communications. In some implementations, the AP 502 additionally includes an application processor 530 coupled with the wireless communication device 510, and a memory 540 coupled with the application processor 530. The AP 502 further includes at least one external network interface 550 that enables the AP 502 to communicate with a core network or backhaul network to gain access to external networks including the Internet. For example, the external network interface 550 may include one or both of a wired (for example, Ethernet) network interface and a wireless network interface (such as a WWAN interface). Ones of the aforementioned components can communicate with other ones of the components directly or indirectly, over at least one bus. The AP 502 further includes a housing that encompasses the wireless communication device 510, the application processor 530, the memory 540, and at least portions of the antennas 520 and external network interface 550.

FIG. 5B shows a block diagram of an example STA 504. For example, the STA 504 can be an example implementation of the STA 104 described with reference to FIG. 1. The STA 504 includes a wireless communication device 515 (although the STA 504 may itself also be referred to generally as a wireless communication device as used herein). For example, the wireless communication device 515 may be an example implementation of the wireless communication device 400 described with reference to FIG. 4. The STA 504 also includes one or more antennas 525 coupled with the wireless communication device 515 to transmit and receive wireless communications. The STA 504 additionally includes an application processor 535 coupled with the wireless communication device 515, and a memory 545 coupled with the application processor 535. In some implementations, the STA 504 further includes a user interface (UI) 555 (such as a touchscreen or keypad) and a display 565, which may be integrated with the UI 555 to form a touchscreen display. In some implementations, the STA 504 may further include one or more sensors 575 such as, for example, one or more inertial sensors, accelerometers, temperature sensors, pressure sensors, or altitude sensors. Ones of the aforementioned components can communicate with other ones of the components directly or indirectly, over at least one bus. The STA 504 further includes a housing that encompasses the wireless communication device 515, the application processor 535, the memory 545, and at least portions of the antennas 525, UI 555, and display 565.

As described above, channel puncturing is a wireless communication technique which enables a wireless communication device (such as an AP or a STA) to transmit and receive wireless communications over a portion of a wireless channel exclusive of particular subchannels (referred to as "punctured subchannels"). For example, if a wireless communication device detects that a 20 MHz subchannel of a 160 MHz wireless channel is occupied, the wireless communication device can use channel puncturing to avoid communicating over the occupied subchannel while still utilizing the remaining 140 MHz bandwidth. Accordingly, channel puncturing allows a wireless communication device to improve or maximize its throughput by utilizing more of the available spectrum. As the bandwidth of the wireless channel increases, the likelihood of interference on one or more subchannels also increases. Thus, as new WLAN communication protocols enable access to a greater range of bandwidths, new channel puncturing indications are needed to efficiently utilize the newly available spectrum.

Various implementations relate generally to channel puncturing in wireless communications, and more particularly, to punctured channel indications that support channel puncturing over a range of bandwidths achievable in accordance with the IEEE 802.11be amendment, and future generations, of the IEEE 802.11 standard. In some aspects, an AP may communicate "static" punctured channel information to each of its associated STAs. The static punctured channel information may indicate one or more channels or subchannels that are likely to be busy or otherwise occupied in a relatively constant or consistent manner (such as by devices in an OBSS). In some other aspects, a transmit opportunity (TXOP) holder may communicate "dynamic" punctured channel information to a TXOP responder. The dynamic punctured channel information may indicate one or more subchannels to be avoided or excluded from communications between the TXOP holder and the TXOP responder (such as in addition to the subchannels indicated by the static punctured channel information). Still further, in some aspects, the TXOP responder may communicate additional punctured channel information to the TXOP holder responsive to the dynamic punctured channel information. The additional punctured channel information may indicate one or more additional subchannels to be avoided or excluded from communications between the TXOP holder and the TXOP responder (such as in addition to the subchannels indicated by the static or dynamic punctured channel information).

Particular implementations of the subject matter described in this disclosure can be implemented to realize one or more of the following potential advantages. By providing static punctured channel information to each device in a given BSS, aspects of the present disclosure may ensure that TXOP holders (and TXOP responders) avoid transmitting wireless communications on portions of a wireless channel that are likely to encounter significant interference. For example, a TXOP holder may puncture one or more subchannels of the wireless channel when transmitting data to a TXOP responder, thereby avoiding interference on the punctured subchannels while still utilizing the remainder of the available spectrum. Aspects of the present disclosure recognize that some channel conditions are likely to change over time, and that the channel conditions perceived by the TXOP holder may be different than the channel conditions perceived by the TXOP responder. For example, the TXOP holder and TXOP responder can each detect which subchannels are occupied at any given time, for example, by performing a CCA on the wireless channel. By providing dynamic punctured channel information to the TXOP responder, the TXOP holder may dynamically update the subchannels to be avoided based on current channel conditions at the time of transmission. By providing additional punctured channel information to the TXOP holder, the TXOP responder may further update the subchannels to be avoided based on current channel conditions at either end of the communication link.

Figure 6:
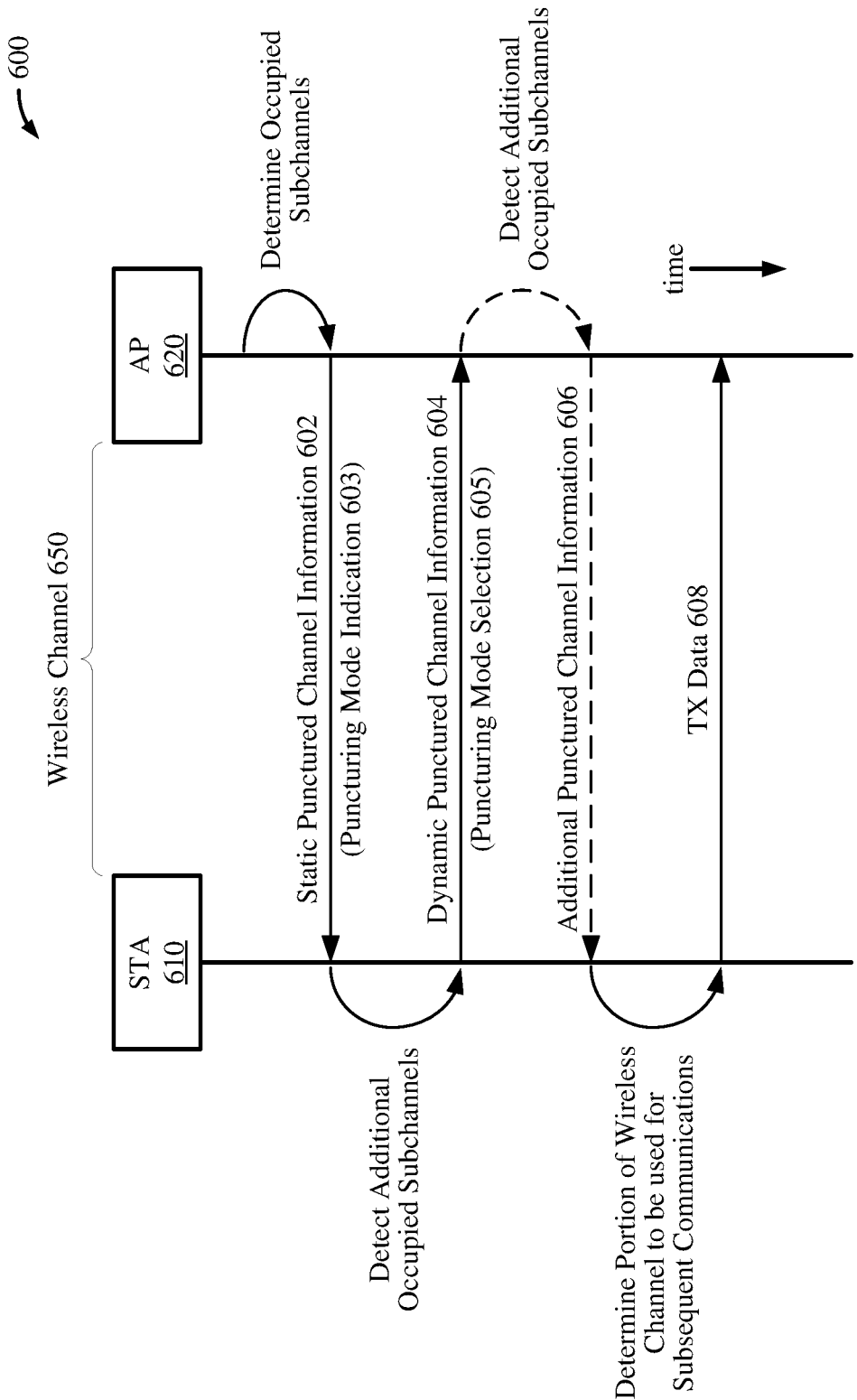
FIG. 6 shows a sequence diagram illustrating an example message exchange between a transmit opportunity (TXOP) holder and a TXOP responder according to some implementations.

FIG. 6 shows a sequence diagram 600 illustrating an example message exchange between a transmit opportunity (TXOP) holder and a TXOP responder according to some implementations. In the example of FIG. 6, the TXOP holder is depicted as a STA 610 and the TXOP responder is depicted as an AP 620. In other words, the STA 610 uses its TXOP to communicate with the AP 620 over a wireless channel 650. In some other implementations, the AP 620 may be the TXOP holder and the STA 610 may be the TXOP responder. In some implementations, the STA 610 may be one example of any of the STAs 104 or 504 of FIGS. 1 and 5B, respectively, and the AP 620 may be one example of any of the APs 102 or 502 of FIGS. 1 and 5B, respectively.

The AP 620 may determine or identify one or more subchannels of the wireless channel 650 that are frequently used or otherwise occupied by devices (or other sources of interference) outside its BSS. For example, such subchannels may be constantly or consistently occupied by legacy or incumbent devices in an OBSS. Because these devices are beyond the AP's control, the AP 620 may require the devices in its BSS to avoid using the occupied subchannels. In some implementations, the AP 620 may transmit static punctured channel information 602 to each device in its BSS to indicate that the occupied subchannels are to be avoided or punctured when utilizing the wireless channel 650. In some aspects, the static punctured channel information 602 may be carried in one or more management frames broadcast or transmitted by the AP 620 to the STA 610. Example suitable management frames include beacon frames, probe response frames, and association response frames, among other examples.

In some implementations, the static punctured channel information 602 may include a bitmap representing a number of subchannels associated with the wireless channel 650. For example, each bit of the bitmap may represent a respective subchannel of the wireless channel 650. A bit value of "1" may indicate that the associated subchannel is to be punctured or avoided, whereas a bit value of "0" may indicate that the associated subchannel can be used for wireless communications. In some aspects, each bit of the bitmap may represent a 20 MHz subchannel. For example, a 16-bit bitmap may be used to indicate puncturing patterns for wireless channels of any size up to and including 320 MHz. In some other aspects, the granularity of the subchannels associated with the bitmap may vary based on the size of the wireless channel. For example, an 8-bit bitmap may be used to indicate puncturing patterns for wireless channels of any size. When the size of the wireless channel is 160 MHz or less, each bit of the bitmap may represent a 20 MHz subchannel. When the size of the wireless channel is greater than 160 MHz, each bit of the bitmap may represent a 40 MHz subchannel.

In some implementations, the AP 620 may add the bitmap to a non-legacy (or Extremely High Throughput (EHT)) operation element of a management frame. Aspects of the present disclosure recognize that adding the bitmap to the non-legacy operation element may increase the overhead of the management frame. Such increase in overhead may be undesirable when there are no punctured channels to indicate (such as when each bit of the bitmap has a value of "0"). Thus, in some aspects, the static punctured channel information 602 may be omitted from any management frames when the AP 620 does not detect any constant or consistently occupied subchannels. For example, a bit may be added to the non-legacy operation element to indicate whether the non-legacy operation element carries static punctured channel information 602. Alternatively, or in addition, the static punctured channel information 602 may be added to the management frames as a new information element (IE). For example, the IE may be added to the management frames only when the static punctured channel information 602 is available.

In some implementations, the STA 610 may detect one or more additional occupied subchannels of the wireless channel 650 after receiving the static punctured channel information 602 from the AP 620. Aspects of the present disclosure further recognize that the conditions of the wireless channel 650 may change over time, and that the static punctured channel information 602 may not account for such dynamic changes in the wireless channel 650. For example, at any given time, the STA 610 may detect interference on one or more subchannels of the wireless channel 650 other than those indicated by the static punctured channel information 602. The STA 610 can detect the additional occupied subchannels, for example, by performing CCA on the remaining subchannels of the wireless channel 650. In some implementations, the STA 610 may transmit dynamic punctured channel information 604 to the AP 620 to indicate the additional subchannels to be avoided or punctured when communicating over the wireless channel 650.

In some implementations, the dynamic punctured channel information 604 may be carried in one or more non-legacy PPDUs transmitted by the STA 610 to the AP 620. As used herein, the term "non-legacy" may refer to frame formats and communication protocols conforming to the IEEE 802.11be amendment, and future generations, of the IEEE 802.11 standard. For example, the IEEE 802.11be amendment defines a non-legacy (or EHT) PPDU format having a PHY preamble which includes a legacy portion and a non-legacy portion. The legacy portion of the PHY preamble includes an L-STF, an L-LTF, and an L-SIG. The non-legacy portion of the PHY preamble includes new fields, such as a universal signal field (U-SIG), which may be used to carry signaling information. For example, U-SIG may include a bandwidth and punctured information subfield having a value which represents a channel puncturing pattern associated with the PPDU. In some aspects, the dynamic punctured channel information 604 may be carried in U-SIG. For example, the information in the bandwidth and punctured information subfield of U-SIG may be used to convey the dynamic punctured channel information 604.

In some other implementations, the dynamic punctured channel information 604 may be carried in one or more null data packet announcement (NDPA) frames transmitted by the STA 610 to the AP 620. For example, the IEEE 802.11 standard defines a channel sounding procedure based on the transmission of null data packets (NDPs). The STA 610 may initiate a channel sounding operation by transmitting an NDPA frame, followed by an NDP, to the AP 620. The NDPA frame format includes a MAC header followed by a sounding dialog token, followed by a number (n) of STA information fields. Each STA information field includes a partial BW information subfield that carries information indicating a bandwidth associated with request sounding feedback (such as a starting resource unit (RU) index and an ending RU index). In some aspects, the dynamic punctured channel information 604 may be carried in a STA information field of an NDPA. For example, the information in the partial bandwidth information subfield of the STA information field may be used to convey the dynamic punctured channel information 604.

In implementations where the TXOP holder is the AP 620, the dynamic punctured channel information 604 may be carried in one or more trigger frames transmitted by the AP 620 to the STA 610. For example, the IEEE 802.11 standard supports trigger-based uplink communications. The AP 620 may transmit a trigger frame to the STA 610 to solicit the transmission of a trigger-based PPDU. Example suitable trigger frames include multi-user request-to-send (MU-RTS) frames, multi-user block acknowledgement request (MU-BAR) frames, and buffer status report poll (BSRP) frames, among other examples. The trigger frame format includes a MAC header followed by a common information field followed by a user information list which may include zero or more user information fields. The common information field includes an uplink bandwidth (UL BW) subfield that carries information indicating a bandwidth associated with the PPDU. Each user information field includes an RU allocation subfield that carries information indicating one or more RUs to be allocated for the PPDU. In some aspects, the dynamic punctured channel information 604 may be carried in the common information field or a user information field of a trigger frame. For example, the information in the UL BW subfield or the RU allocation subfield may be used to convey the dynamic punctured channel information 604.

Still further, in some implementations, the dynamic punctured channel information 604 may be carried in one or more control frames transmitted by the STA 610 to the AP 620. Example suitable control frames include request-to-send (RTS) frames, power save polling (PS-POLL) frames, and block acknowledgement request (BAR) frames, among other examples. The control frame format includes a PHY preamble followed by a data portion. The data portion includes a service field followed by a PSDU. The service field carries a scrambler initialization sequence that can be used to synchronize a descrambler of the receiving device (such as the AP 620). Aspects of the present disclosure recognize that the service field also includes a number of remaining bits unrelated to the scrambler initialization sequence. In existing versions of the IEEE 802.11 standard, the remaining bits in the service field are reserved. In some aspects, the dynamic punctured channel information 604 may be carried in the service field of a control frame. For example, the remaining bits of the service field may be repurposed to convey the dynamic punctured channel information 604.

In some implementations, the AP 620 may detect one or more additional occupied subchannels of the wireless channel 650 after receiving the dynamic punctured channel information 604 from the STA 610. Aspects of the present disclosure further recognize that the channel conditions perceived by the STA 610 may be different than the channel conditions perceived by the AP 620. For example, at any given time, the AP 620 may be proximate to sources of interference that are undetectable by the STA 610. Thus, the AP 620 may detect interference on one or more subchannels of the wireless channel 650 other than those indicated by the static punctured channel information 602 or the dynamic punctured channel information 604. The AP 620 can detect the additional occupied subchannels, for example, by performing CCA on the remaining subchannels of the wireless channel 650. In some implementations, the AP 620 may transmit additional punctured channel information 606 to the STA 610 to indicate the additional subchannels to be avoided or punctured when communicating over the wireless channel 650.

In some implementations, the additional punctured channel information 606 may be carried in a clear-to-send (CTS) frame transmitted by the AP 620 to the STA 610. For example, the IEEE 802.11 standard defines a control frame format that can be used for bandwidth negotiation between a requesting device (such as the STA 610) and a responding device (such as the AP 620). As used herein, the term "bandwidth negotiation frame" may refer to any control frame usable for bandwidth negotiations. Example suitable bandwidth negotiation frames include RTS frames and CTS frames, among other examples. During a bandwidth negotiation operation, the RTS frame may carry bandwidth information indicating a desired bandwidth over which the requesting device would like to transmit subsequent data frames and the CTS frame also may carry bandwidth information indicating the bandwidth available to the requesting device for the transmission of the data frames. Aspects of the present disclosure recognize that, similar to the bandwidth negotiation operation, punctured subchannels also may be negotiated between a TXOP holder and a TXOP responder. For example, the TXOP holder and TXOP responder may reuse the bandwidth negotiation frames to negotiate the punctured subchannels. In some aspects, the additional punctured channel information 606 may be carried in the service field of a CTS frame. For example, the remaining bits of the service field may be repurposed to convey the additional punctured channel information 606 (similar to the dynamic punctured channel information 604).

In some other implementations, the TXOP responder may not negotiate punctured subchannels with the TXOP holder. In such implementations, the AP 620 may not transmit additional punctured channel information 606 to the STA 610. However, in some instances (such as during a bandwidth negotiation operation), the AP 620 may still transmit a response (such as a CTS frame) to the STA 610 after receiving the dynamic punctured channel information 604. If the AP 620 is unable to support the full range of subchannels requested by the STA 610 (due to interference detected on one or more additional subchannels), the AP 620 may indicate, in its response to the STA 610, that only a particular sub-band within the wireless channel 650 is available for use. For example, if the STA 610 transmits an RTS frame requesting a 320 MHz channel, the AP 620 may respond with a CTS frame indicating that only a 160 MHz channel is available. In some aspects, the response from the AP 620 may include the dynamic punctured channel information 604 received from the STA 610. For example, the dynamic punctured channel information 604 may be carried in a CTS frame transmitted by the AP 620 to the STA 610. In some other aspects, the response from the AP 620 may not include any punctured channel information. For example, the dynamic punctured channel information 604 may be absent from the CTS frame transmitted by the AP 620 to the STA 610 when operating in the 5 GHz frequency band.

The STA 610 determines a portion of the wireless channel 650 to be used for subsequent communications with the AP 620 based on the punctured subchannels indicated in the static punctured channel information 602, the dynamic punctured channel information 604, and the additional punctured channel information 606 (if any). In some aspects, the portion of the wireless channel 650 usable by the STA 610 may include the full range of subchannels associated with the wireless channel 650, contiguous or non-contiguous, excluding any punctured subchannels determined by the AP 620 or the STA 610. In some other aspects, the portion of the wireless channel 650 usable by the STA 610 may include only a subset of contiguous subchannels spanning a subband of the wireless channel 650 (such as indicated by the AP 620 during a bandwidth negotiation operation). The STA 610 may proceed to transmit data 608 to the AP 620 over the determined portion of the wireless channel 650.

In some implementations, a BSS may support at least one of multiple modes of punctured channel control. In a first mode, punctured subchannels cannot be negotiated between the TXOP holder and the TXOP responder. In other words, only the TXOP holder may determine the punctured subchannels to be used for subsequent communications with the TXOP responder. For example, in the first mode, the STA 610 may transmit dynamic punctured channel information 604 to the AP 620, but the AP 620 may not transmit additional punctured channel information 606 to the STA 610. In a second mode, punctured subchannels can be negotiated between the TXOP holder and the TXOP responder. In other words, the TXOP holder and the TXOP responder may collectively determine the punctured subchannels to be used for subsequent communications with one another. For example, in the second mode, the STA 610 may transmit dynamic punctured channel information 604 to the AP 620, and the AP may transmit additional punctured channel information 606 to the STA 610.

In some implementations, the AP 620 may transmit a puncturing mode indication 603 to each device in its BSS indicating which, if any, of the punctured channel control mode are supported by the BSS. For example, puncturing mode indication 603 may include two or more bits that can be used to indicate whether the BSS supports the first mode, the second mode, or neither of the modes (the BSS does not support punctured channel control). In some aspects, the puncturing mode indication 603 may be carried in one or more management frames broadcast or transmitted by the AP 620 to the STA 610. Example suitable management frames include beacon frames, probe response frames, and association response frames, among other examples. In some implementations, the AP 620 may add the two or more bits to a non-legacy (or EHT) capability element of a management frame. Thus, as shown in FIG. 6, the puncturing mode indication 603 may be transmitted together with the static punctured channel information 602 in the same management frame.

In some other implementations, the STA 610 may dynamically select one of the modes supported by the AP 620. For example, the STA 610 may transmit a puncturing mode selection 605 to the AP 620 indicating whether the AP 620 can provide additional punctured channel information 606 to the STA 610. In some configurations, the STA 610 may support receiving additional punctured channel information 606 from the AP 620 such as, for example, to ensure the highest quality of communications with the AP 620. In some other configurations, the STA 610 may not support receiving additional punctured channel information 606 from the AP 620 such as, for example, when attempting to maximize its bandwidth utilization. In some aspects, the puncturing mode selection 605 may be carried in the service field of a control frame (such as an RTS frame or other bandwidth negotiation frame). For example, one or more of the remaining bits of the service field of the control frame may be repurposed to convey the puncturing mode selection 605. Thus, as shown in FIG. 6, the puncturing mode selection 605 may be transmitted together with the dynamic punctured channel information 604 in the same control frame.

Figure 7A:
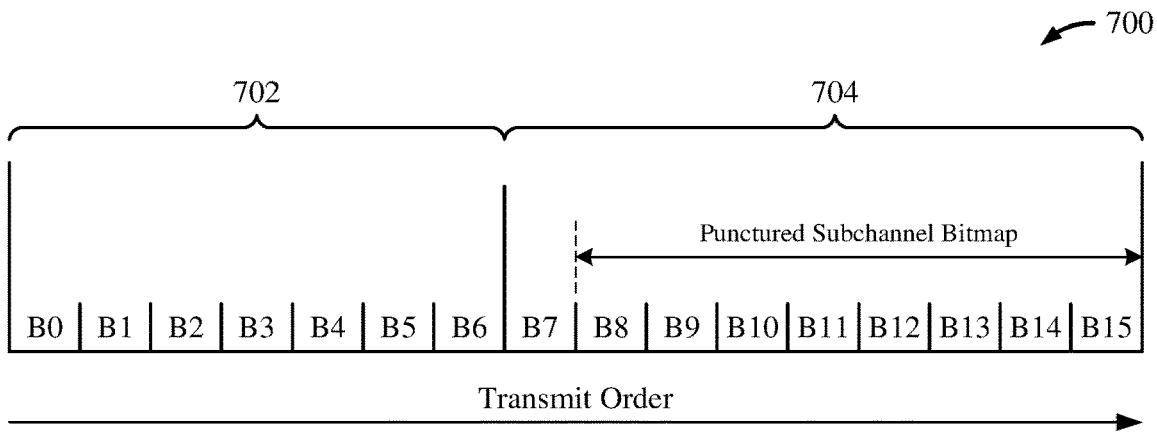
FIG. 7A shows an example configuration for a service field of a control frame according to some implementations.

FIG. 7A shows an example configuration for a service field 700 of a control frame according to some implementations. The service field 700 includes a sequence of scrambler initialization bits 702 and a number of remaining bits 704. As shown in FIG. 7A, the service field 700 is 2 octets (16 bits) in length, however, the scrambler initialization sequence 702 represents only the first 7 bits of the service field 700 (coinciding with bit positions B0-B6). As described above with reference to FIG. 6, the scrambler initialization sequence 702 may be used to synchronize a descrambler of a receiving device.

Aspects of the present disclosure recognize that the remaining bits 704 of the service field 700 are reserved in existing (non-HT) PPDU formats. More specifically, each of the remaining bits 704 is set to a value of "0" in legacy control frames (such as RTS, CTS, PS-POLL, and BAR frames). As used herein, the term "legacy" may refer to frame formats and communication protocols conforming to the IEEE 802.11ax amendment of the IEEE 802.11 standard. In some implementations, at least eight of the remaining bits 704 may be repurposed to convey punctured channel information (such as the dynamic punctured channel information 604 or the additional punctured channel information 606 of FIG. 6). In the example of FIG. 7A, the punctured channel information is carried on the last eight remaining bits 704 (coinciding with bit position B8-B15 of the service field 700). However, in actual implementations, any of the remaining bits 704 may be repurposed to convey the punctured channel information.

In some implementations, the punctured channel information may be represented by a punctured subchannel bitmap. For example, each of the bit positions B8-B15 may represent a respective subchannel of a wireless channel (where bit position B8 represents the lowest subchannel, and bit position B15 represents the highest subchannel, of the wireless channel). A bit value of "1" may indicate that the associated subchannel is to be punctured or avoided, whereas a bit value of "0" may indicate that the associated subchannel can be used for wireless communications. In some aspects, the granularity of each subchannel may depend on the size of the wireless channel. For example, when the punctured subchannel bitmap represents a wireless channel greater than 160 MHz, each bit may represent a respective 40 MHz subchannel. On the other hand, when the punctured subchannel bitmap represents a wireless channel of 160 MHz or smaller, each bit may represent a respective 20 MHz subchannel.

Figure 7B:
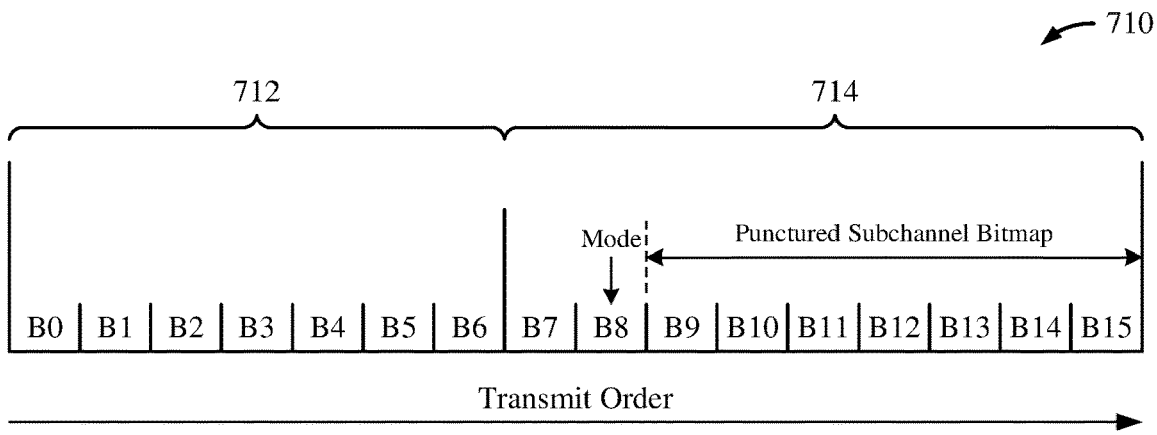
FIG. 7B shows another example configuration for a service field of a control frame according to some implementations.

FIG. 7B shows another example configuration for a service field 710 of a control frame according to some implementations. The service field 710 includes a sequence of scrambler initialization bits 712 and a number of remaining bits 714. As shown in FIG. 7B, the service field 710 is 2 octets (16 bits) in length, however, the scrambler initialization sequence 712 represents only the first 7 bits of the service field 710 (coinciding with bit positions B0-B6). As described above with reference to FIG. 6, the scrambler initialization sequence 712 may be used to synchronize a descrambler of a receiving device.

As described above with reference to FIG. 7A, the remaining bits 714 of the service field 710 are reserved in existing (non-HT) PPDU formats. Aspects of the present disclosure further recognize that, in accordance with the IEEE 802.11 standard, a primary subchannel cannot be punctured. Thus, only 7 bits may be needed to represent each of the subchannels of a wireless channel that can be punctured. In some implementations, seven of the remaining bits 714 may be repurposed to convey punctured channel information (such as the dynamic punctured channel information 604 or the additional punctured channel information 606 of FIG. 6). In the example of FIG. 7B, the punctured channel information is carried on the last seven remaining bits 714 (coinciding with bit position B9-B15 of the service field 710). However, in actual implementations, any of the remaining bits 714 may be repurposed to convey the punctured channel information.

In some implementations, the punctured channel information may be represented by a punctured subchannel bitmap. For example, each of the bit positions B9-B15 may represent a respective subchannel of a wireless channel (where bit position B9 represents the lowest subchannel, and bit position B15 represents the highest subchannel, of the wireless channel). A bit value of "1" may indicate that the associated subchannel is to be punctured or avoided, whereas a bit value of "0" may indicate that the associated subchannel can be used for wireless communications. In some aspects, the granularity of each subchannel may depend on the size of the wireless channel. For example, when the punctured subchannel bitmap represents a wireless channel greater than 160 MHz, each bit may represent a respective 40 MHz subchannel. On the other hand, when the punctured subchannel bitmap represents a wireless channel of 160 MHz or smaller, each bit may represent a respective 20 MHz subchannel.

In comparison with the punctured subchannel bitmap of FIG. 7A, the punctured subchannel bitmap of FIG. 7B leaves one unused bit of the remaining bits 704 (such as in bit position B8). In some implementations, this unused bit may be repurposed to convey puncturing mode information (such as the puncturing mode selection 605 of FIG. 6). For example a bit value of "0" may indicate that the TXOP holder supports only the first punctured channel control mode (where punctured subchannels cannot be negotiated between the TXOP holder and the TXOP responder), and a bit value of "1" may indicate that the TXOP holder supports the second punctured channel control mode (where punctured subchannels can be negotiated between the TXOP holder and the TXOP responder). In some other implementations, the unused bit may be reserved for future use.

Figure 7C:
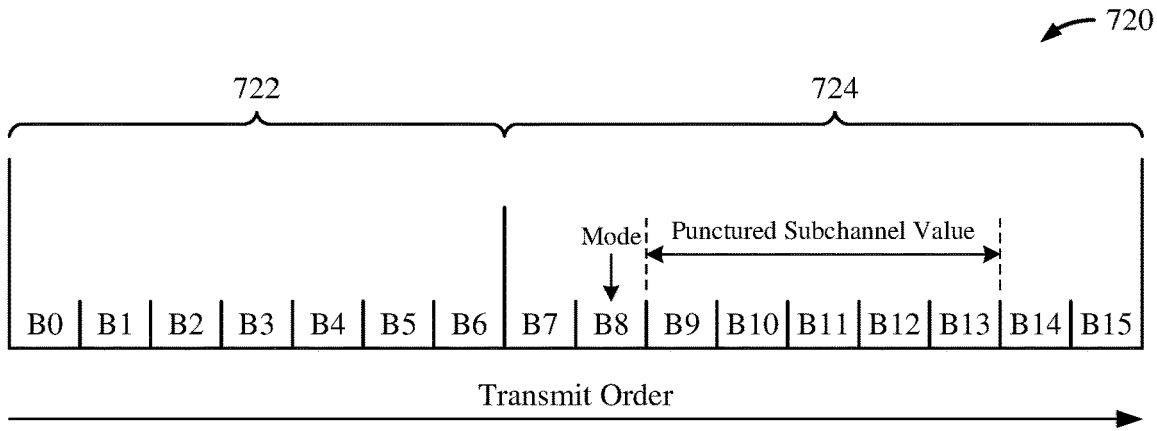
FIG. 7C shows another example configuration for a service field of a control frame according to some implementations.

FIG. 7C shows another example configuration for a service field 720 of a control frame according to some implementations. The service field 720 includes a sequence of scrambler initialization bits 722 and a number of remaining bits 724. As shown in FIG. 7C, the service field 720 is 2 octets (16 bits) in length, however, the scrambler initialization sequence 722 represents only the first 7 bits of the service field 720 (coinciding with bit positions B0-B6). As described above with reference to FIG. 6, the scrambler initialization sequence 722 may be used to synchronize a descrambler of a receiving device.

As described above with reference to FIG. 7A, the remaining bits 724 of the service field 720 are reserved in existing (non-HT) PPDU formats. In some implementations, five of the remaining bits 724 may be repurposed to convey punctured channel information (such as the dynamic punctured channel information 604 or the additional punctured channel information 606 of FIG. 6). In the example of FIG. 7C, the punctured channel information is carried on the five remaining bits 724 coinciding with bit positions B9-B13 of the service field 720. However, in actual implementations, any of the remaining bits 724 may be repurposed to convey the punctured channel information.

In some implementations, the punctured channel information may be represented by a punctured subchannel value (rather than a bitmap). In other words, a combined value of the bits in bit positions B9-B13 may represent a known pattern of punctured subchannels (similar to how punctured channel information is conveyed in the bandwidth and punctured information subfield of U-SIG). For example, each pattern of 5 bits may be mapped to a unique set of punctured subchannels for a given bandwidth (which may also be indicated by the service field 720). Thus, after determining the bandwidth associated with the punctured channel information, a receiving device may use a lookup table to determine the particular punctured subchannels represented by the punctured subchannel value.

In comparison with the punctured subchannel bitmap of FIG. 7A, the punctured subchannel value of FIG. 7C leaves three unused bits of the remaining bits 704 (such as in bit positions B8, B14, and B15). In some implementations, one of these unused bits (such as the bit in bit position B8) may be repurposed to convey puncturing mode information (such as the puncturing mode selection 605 of FIG. 6). For example a bit value of "0" may indicate that the TXOP holder supports only the first punctured channel control mode (where punctured subchannels cannot be negotiated between the TXOP holder and the TXOP responder), and a bit value of "1" may indicate that the TXOP holder supports the second punctured channel control mode (where punctured subchannels can be negotiated between the TXOP holder and the TXOP responder). The remaining unused bits (in bit positions B14 and B15) may be reserved for future use. In some other implementations, all three unused bits may be reserved for future use.

Figure 8A:
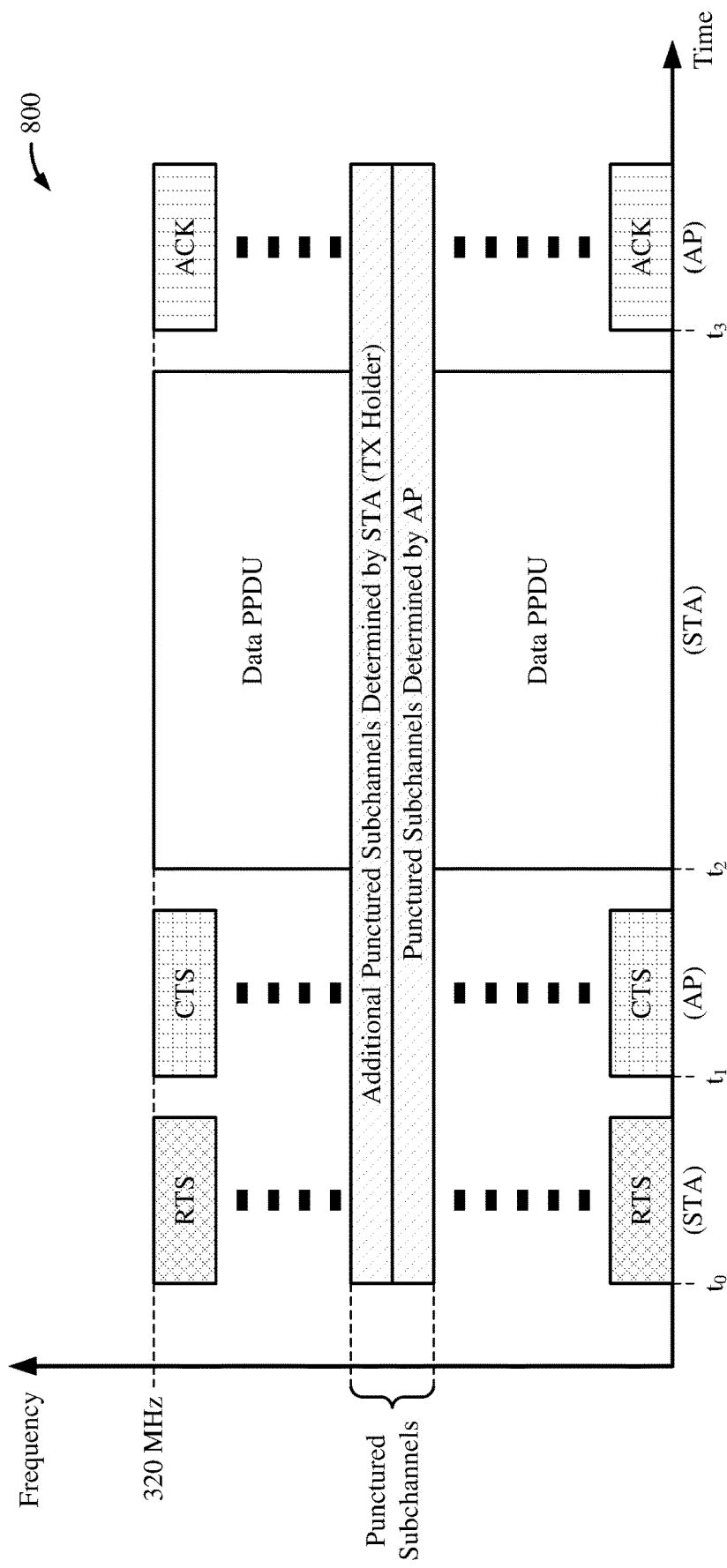
FIG. 8A shows a timing diagram illustrating an example bandwidth negotiation operation between an AP and a STA according to some implementations.

FIG. 8A shows a timing diagram illustrating an example bandwidth negotiation operation 800 between an AP and a STA according to some implementations. The AP may be one example of the APs 102 or 502 of FIGS. 1 and 5A, respectively. The STA may be one example of the STAs 104 or 504 of FIGS. 1 and 5B, respectively. In the example of FIG. 8A, the STA is described as the TXOP holder and the AP is described as the TXOP responder. However, in other implementations, the AP may be the TXOP holder and the STA may be the TXOP responder. In some implementations, the STA and the AP may operate in accordance with the first punctured channel control mode (where punctured subchannels cannot be negotiated between the TXOP holder and the TXOP responder).

At time $t_0$, the STA transmits an RTS frame to the AP that is duplicated over a 320 MHz channel, excluding a number of punctured subchannels. In the example of FIG. 8A, the punctured subchannels may represent one or more occupied subchannels detected by the AP and one or more additional occupied subchannels detected by the STA. In some implementations, the RTS frame may carry punctured channel information indicating the punctured subchannels to be avoided or punctured when communicating over the 320 MHz channel. For example, the punctured channel information may be carried by one or more of the remaining bits following a scrambler initialization sequence in the service field of the RTS frame (such as described with reference to FIGS. 7A-7C).

The AP receives the RTS frame and may interpret one or more bits of the service field to carry punctured channel information. The AP may further determine the punctured subchannels represented by the received punctured channel information. In the example of FIG. 8A, the AP may not detect any additional occupied subchannels within the 320 MHz channel. Thus, at time $t_1$, the AP transmits a CTS frame to the STA that is duplicated over the 320 MHz channel, excluding the punctured subchannels indicated by the STA. In some implementations, the CTS frame also may carry punctured channel information identifying the same punctured subchannels as indicated in the RTS frame. In some other implementations, the CTS frame may not carry any punctured channel information.

In the example of FIG. 8A, the CTS frame may indicate that the AP supports the 320 MHz channel (and punctured subchannels) requested by the STA. The STA receives the CTS frame and, at time t2, proceeds to transmit a data PPDU to the AP over the portion of the 320 MHz channel which excludes the punctured subchannels. At time t3, the AP confirms receipt of the data PPDU by transmitting an acknowledgement (ACK) frame back to the STA. As shown in FIG. 8A, the ACK frame also may be duplicated over the 320 MHz channel, excluding the punctured subchannels.

Figure 8B:
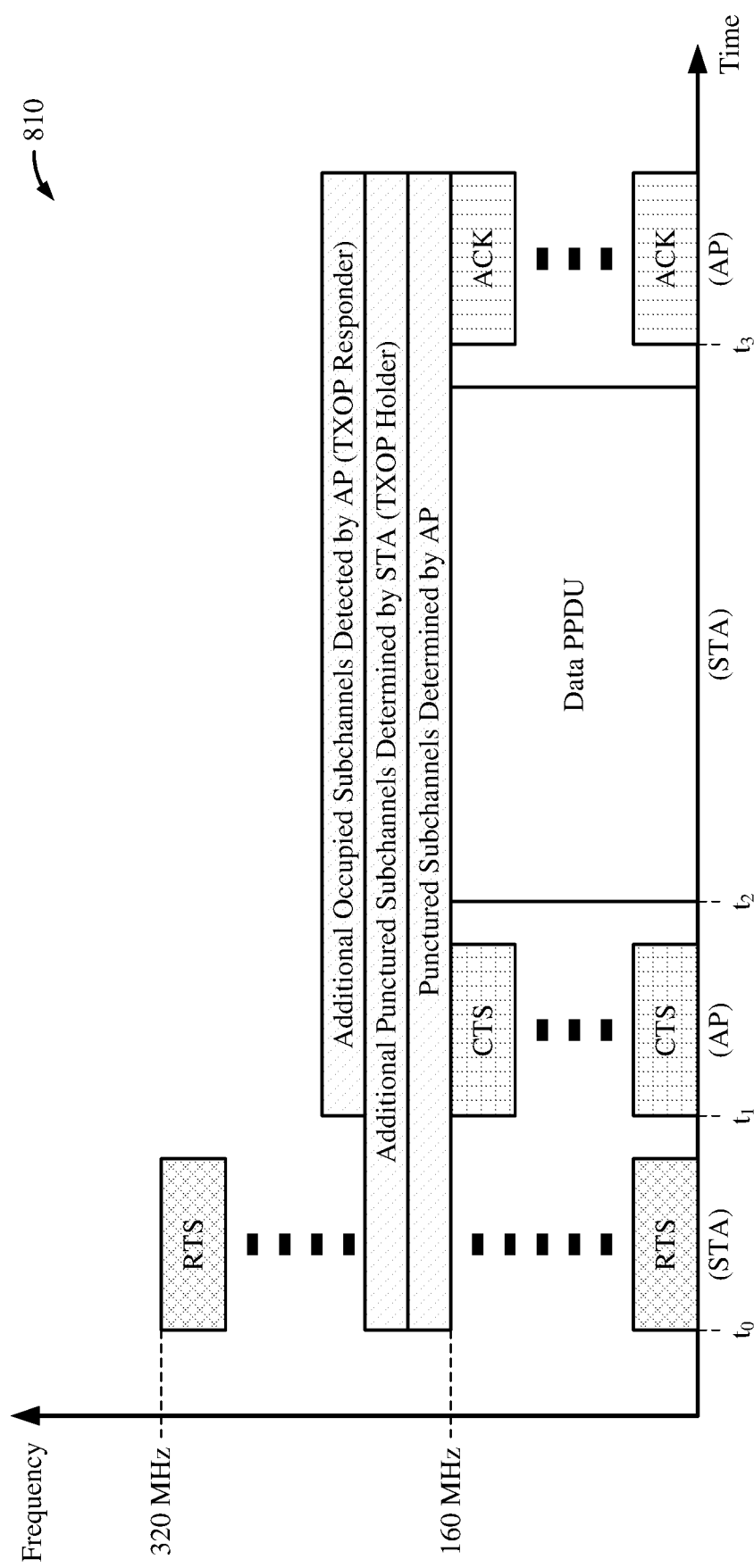
FIG. 8B shows a timing diagram illustrating another example bandwidth negotiation operation between an AP and a STA according to some implementations.

FIG. 8B shows a timing diagram illustrating another example bandwidth negotiation operation 810 between an AP and a STA according to some implementations. The AP may be one example of the APs 102 or 502 of FIGS. 1 and 5A, respectively. The STA may be one example of the STAs 104 or 504 of FIGS. 1 and 5B, respectively. In the example of FIG. 8B, the STA is described as the TXOP holder and the AP is described as the TXOP responder. However, in other implementations, the AP may be the TXOP holder and the STA may be the TXOP responder. In some implementations, the STA and the AP may operate in accordance with the first punctured channel control mode (where punctured subchannels cannot be negotiated between the TXOP holder and the TXOP responder).

At time $t_0$, the STA transmits an RTS frame to the AP that is duplicated over a 320 MHz channel, excluding a number of punctured subchannels. In the example of FIG. 8B, the punctured subchannels may represent one or more occupied subchannels detected by the AP and one or more additional occupied subchannels detected by the STA. In some implementations, the RTS frame may carry punctured channel information indicating the punctured subchannels to be avoided or punctured when communicating over the 320 MHz channel. For example, the punctured channel information may be carried by one or more of the remaining bits following a scrambler initialization sequence in the service field of the RTS frame (such as described with reference to FIGS. 7A-7C).

The AP receives the RTS frame and may interpret one or more bits of the service field to carry punctured channel information. The AP may further determine the punctured subchannels represented by the received punctured channel information. In the example of FIG. 8B, the AP may detect a number of additional occupied subchannels in the upper 160 MHz sub-band of the 320 MHz channel. Because the STA does not support punctured channel negotiation, the AP may prevent the STA from utilizing the upper 160 MHz sub-band of the 320 MHz channel. Thus, at time $t_1$, the AP transmits a CTS frame to the STA that is duplicated over the lower 160 MHz sub-band. In some implementations, the CTS frame also may carry punctured channel information identifying the same punctured subchannels as indicated in the RTS frame. In some other implementations, the CTS frame may not carry any punctured channel information.

In the example of FIG. 8B, the CTS frame may indicate that the AP does not support the 320 MHz channel requested by the STA. For example, the CTS frame may indicate that only the lower 160 MHz sub-band can be used for subsequent communications over the wireless channel. The STA receives the CTS frame and, at time t2, proceeds to transmit a data PPDU to the AP over the lower 160 MHz sub-band of the 320 MHz channel. At time t3, the AP confirms receipt of the data PPDU by transmitting an acknowledgement (ACK) frame back to the STA. As shown in FIG. 8B, the ACK frame also may be duplicated over the lower 160 MHz sub-band of the 320 MHz channel.

Figure 9:
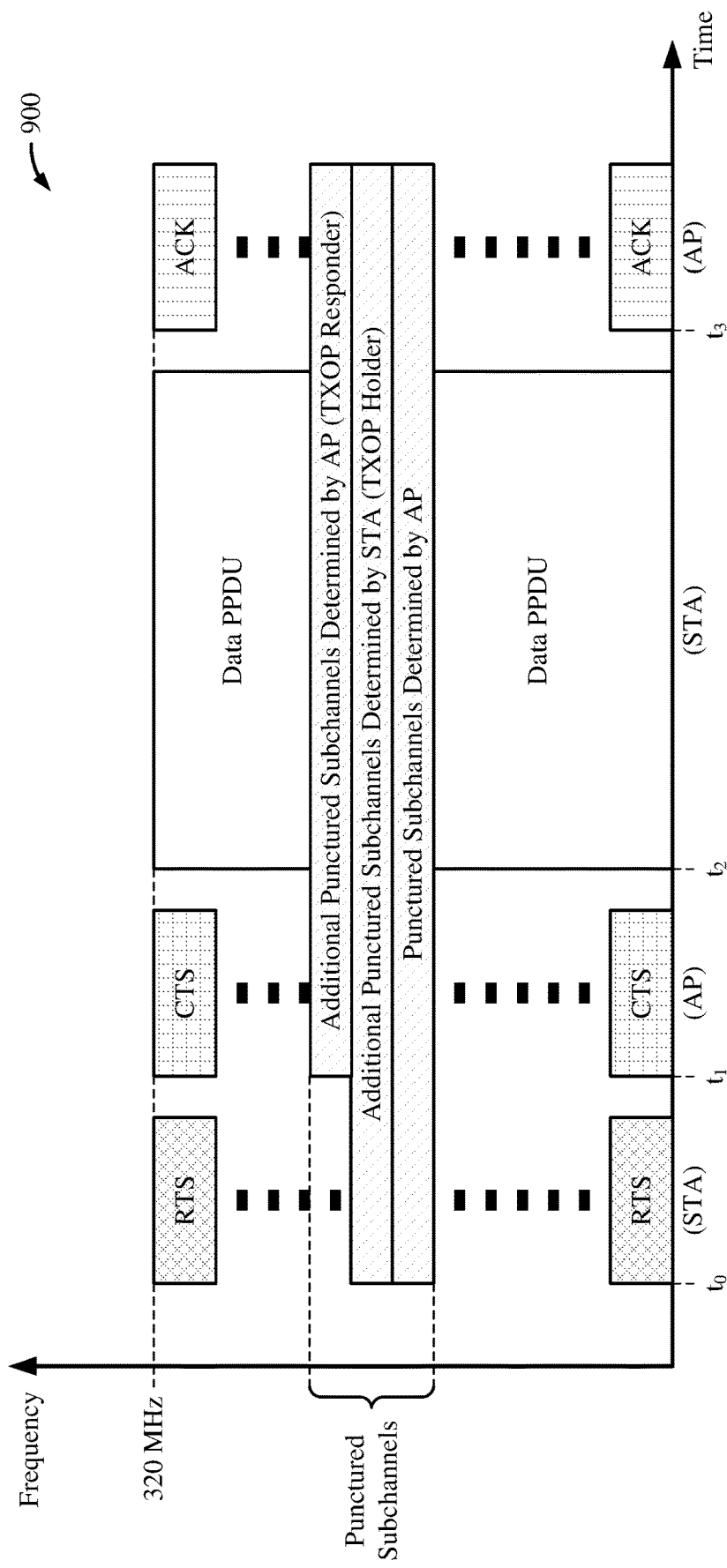
FIG. 9 shows a timing diagram illustrating another example bandwidth negotiation operation between an AP and a STA according to some implementations.

FIG. 9 shows a timing diagram illustrating another example bandwidth negotiation operation 900 between an AP and a STA according to some implementations. The AP may be one example of the APs 102 or 502 of FIGS. 1 and 5A, respectively. The STA may be one example of the STAs 104 or 504 of FIGS. 1 and 5B, respectively. In the example of FIG. 9, the STA is described as the TXOP holder and the AP is described as the TXOP responder. However, in other implementations, the AP may be the TXOP holder and the STA may be the TXOP responder. In some implementations, the STA and the AP may operate in accordance with the second punctured channel control mode (where punctured subchannels can be negotiated between the TXOP holder and the TXOP responder).

At time $t_0$, the STA transmits an RTS frame to the AP that is duplicated over a 320 MHz channel, excluding a number of punctured subchannels. In the example of FIG. 9, the punctured subchannels may represent one or more occupied subchannels detected by the AP and one or more additional occupied subchannels detected by the STA. In some implementations, the RTS frame may carry punctured channel information indicating the punctured subchannels to be avoided or punctured when communicating over the 320 MHz channel. For example, the punctured channel information may be carried by one or more of the remaining bits following a scrambler initialization sequence in the service field of the RTS frame (such as described with reference to FIGS. 7A-7C).

The AP receives the RTS frame and may interpret one or more bits of the service field to carry punctured channel information. The AP may further determine the punctured subchannels represented by the received punctured channel information. In the example of FIG. 9, the AP may detect a number of additional occupied subchannels in the upper 160 MHz sub-band of the 320 MHz channel. Because the STA supports punctured channel negotiation, the AP may allow the STA to utilize any portion of the 320 MHz channel exclusive of the occupied subchannels. Thus, at time $t_1$, the AP transmits a CTS frame to the STA that is duplicated over the 320 MHz channel, excluding the punctured subchannels indicated by the STA and the additional punctured subchannels determined by the AP. In some implementations, the CTS frame also may carry punctured channel information identifying the punctured subchannels indicated in the RTS frame and the additional punctured subchannels determined by the AP. In some other implementations, the CTS frame may not carry any punctured channel information.

In the example of FIG. 9, the CTS frame may indicate that the AP supports the 320 MHz channel (and punctured subchannels) requested by the STA. The STA receives the CTS frame and, at time t2, proceeds to transmit a data PPDU to the AP over the portion of the 320 MHz channel which excludes the punctured subchannels determined by the STA and the additional punctured subchannels determined by the AP. At time t3, the AP confirms receipt of the data PPDU by transmitting an acknowledgement (ACK) frame back to the STA. As shown in FIG. 9, the ACK frame also may be duplicated over the lower 320 MHz channel, excluding the punctured subchannels determined by the STA and the additional punctured subchannels determined by the AP.

Figure 10A:
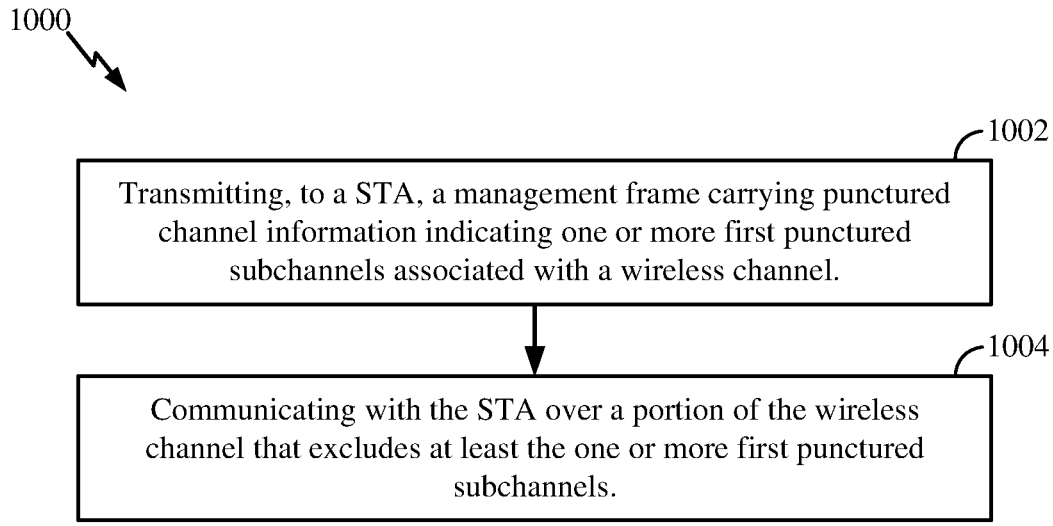
FIG. 10A shows a flowchart illustrating an example process for wireless communication that supports enhanced bandwidth puncturing according to some implementations.

FIG. 10A shows a flowchart illustrating an example process 1000 for wireless communication that supports enhanced bandwidth puncturing according to some implementations. In some implementations, the process 1000 may be performed by a wireless communication device operating as or within an AP such as one of the APs 102 or 502 of FIGS. 1 and 5A, respectively.

In some implementations, the process 1000 begins in block 1002 by transmitting, to a STA, a management frame carrying punctured channel information indicating one or more first punctured subchannels associated with a wireless channel. In block 1004, the process 1000 proceeds with communicating with the STA over a portion of the wireless channel that excludes at least the one or more first punctured subchannels.

In some aspects, the punctured channel information may include a bitmap representing a plurality of subchannels associated with the wireless channel, where the one or more first punctured subchannels are indicated by one or more bits, respectively, of the bitmap. In some implementations, each bit of the bitmap may represent a respective 20 MHz subchannel. In some implementations, the bitmap may be carried in a non-legacy operation element of the management frame.

In some aspects, the punctured channel information may include a puncturing mode indication indicating whether a TXOP holder is permitted to indicate one or more second punctured subchannels to a TXOP responder, where the one or more second punctured subchannels are different than the one or more first punctured subchannels. In some implementations, the puncturing mode indication may be carried in a non-legacy capability element of the management frame. In some aspects, the puncturing mode indication may further indicate whether the TXOP responder is permitted to indicate one or more third punctured subchannels to the TXOP holder, where the third punctured subchannels are different than the first punctured subchannels and the second punctured subchannels.

In some aspects, a packet carrying dynamic punctured channel information may be received from the STA. In some implementations, the dynamic punctured channel information may indicate one or more second punctured subchannels that are different than the one or more first punctured subchannels, where the portion of the wireless channel further excludes the one or more second punctured subchannels.

Figure 10B:
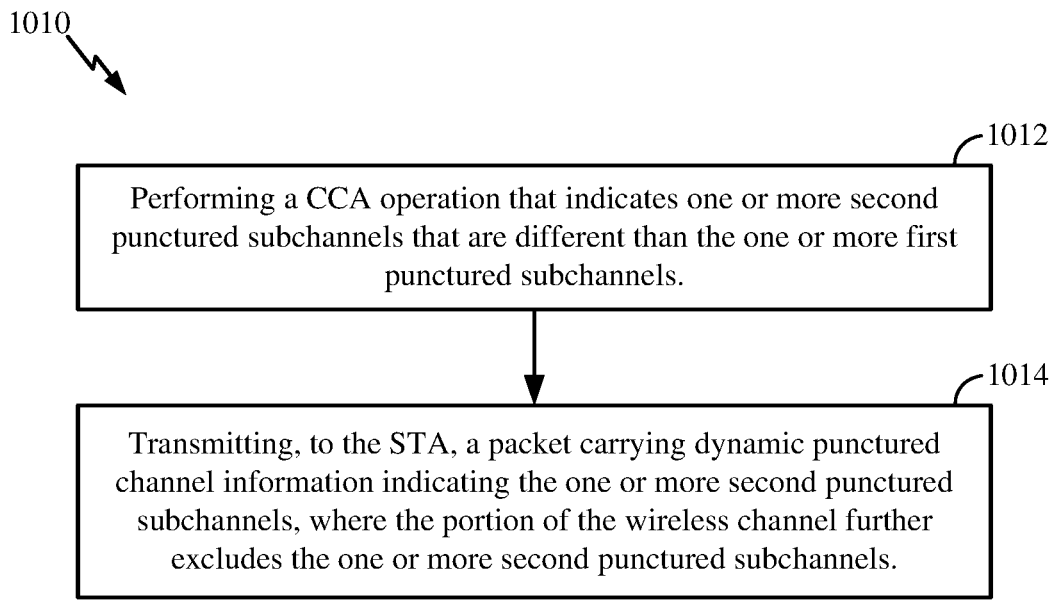
FIG. 10B shows a flowchart illustrating an example process for wireless communication that supports enhanced bandwidth puncturing according to some implementations.

FIG. 10B shows a flowchart illustrating an example process 1010 for wireless communication that supports enhanced bandwidth puncturing according to some implementations. In some implementations, the process 1010 may be performed by a wireless communication device operating as or within an AP such as one of the APs 102 or 502 of FIGS. 1 and 5A, respectively.

With reference for example to FIG. 10A, the process 1010 may begin, in block 1012, after the transmission of the management frame in block 1002 and before the communication with the STA in block 1004. In some implementations, the process 1010 begins in block 1012 by performing a CCA operation that indicates one or more second punctured subchannels that are different than the one or more first punctured subchannels. In block 1014, the process 1010 proceeds with transmitting, to the STA, a packet carrying dynamic punctured channel information indicating the one or more second punctured subchannels, where the portion of the wireless channel further excludes the one or more second punctured subchannels.

In some aspects, the packet may be a PPDU and the dynamic punctured channel information may be carried in a U-SIG field of the PPDU. In some other aspects, the packet may be a control frame and the dynamic punctured channel information may be carried in a service field of the control frame. In some implementations, the dynamic punctured channel information may include a bitmap representing a plurality of subchannels of the wireless channel, where the one or more second punctured subchannels are indicated by one or more bits, respectively, of the bitmap. In some other implementations, the dynamic punctured channel information may be carried on five bits of the service field having a value that maps to the one or more first punctured subchannels.

Figure 11A:
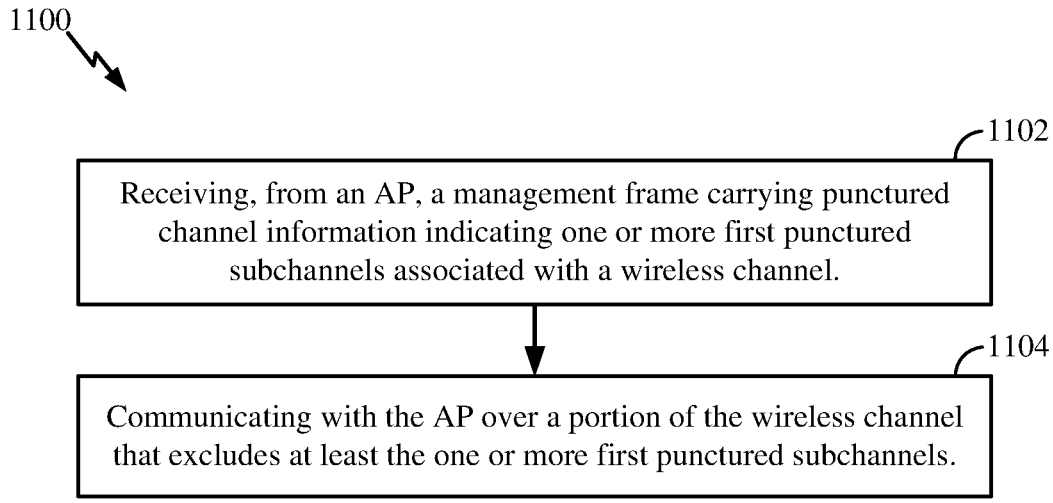
FIG. 11A shows a flowchart illustrating an example process for wireless communication that supports enhanced bandwidth puncturing according to some implementations.

FIG. 11A shows a flowchart illustrating an example process 1100 for wireless communication that supports enhanced bandwidth puncturing according to some implementations. In some implementations, the process 1100 may be performed by a wireless communication device operating as or within a STA such as one of the STAs 104 or 504 of FIGS. 1 and 5B, respectively.

In some implementations, the process 1100 begins in block 1102 by receiving, from an AP, a management frame carrying punctured channel information indicating one or more first punctured subchannels associated with a wireless channel. In block 1104, the process 1100 proceeds with communicating with the AP over a portion of the wireless channel that excludes at least the one or more first punctured subchannels.

In some aspects, the punctured channel information may include a bitmap representing a plurality of subchannels associated with the wireless channel, where the one or more first punctured subchannels are indicated by one or more bits, respectively, of the bitmap. In some implementations, each bit of the bitmap may represent a respective 20 MHz subchannel. In some implementations, the bitmap may be carried in a non-legacy operation element of the management frame.

In some aspects, the punctured channel information may include a puncturing mode indication indicating whether a TXOP holder is permitted to indicate one or more second punctured subchannels to a TXOP responder, where the one or more second punctured subchannels are different than the one or more first punctured subchannels. In some implementations, the puncturing mode indication may be carried in a non-legacy capability element of the management frame. In some aspects, the puncturing mode indication may further indicate whether the TXOP responder is permitted to indicate one or more third punctured subchannels to the TXOP holder, where the third punctured subchannels are different than the first punctured subchannels and the second punctured subchannels.

In some aspects, a packet carrying dynamic punctured channel information may be received from the AP. In some implementations, the dynamic punctured channel information may indicate one or more second punctured subchannels that are different than the one or more first punctured subchannels, where the portion of the wireless channel further excludes the one or more second punctured subchannels.

Figure 11B:
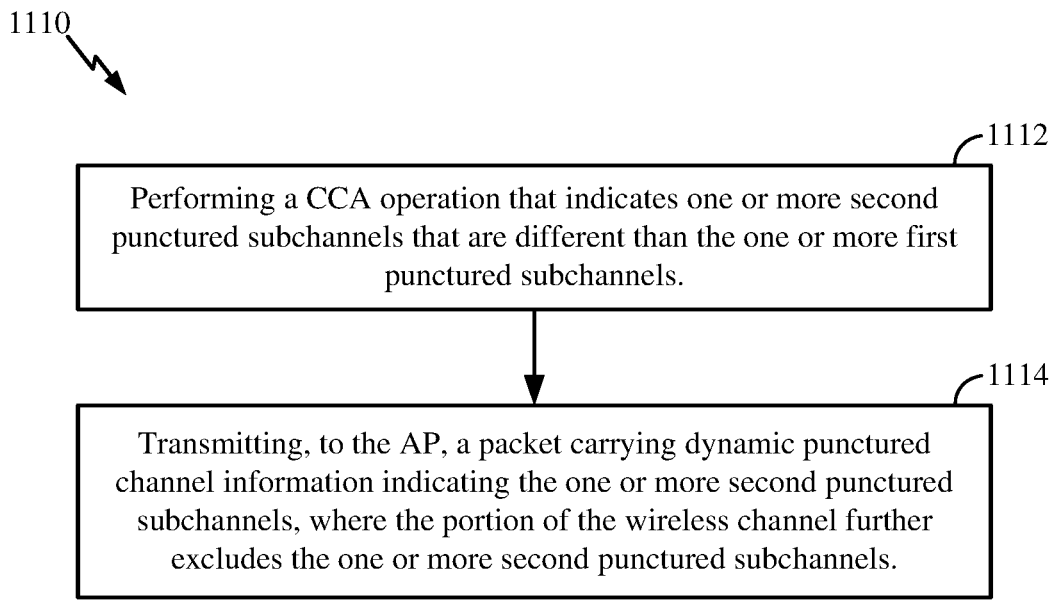
FIG. 11B shows a flowchart illustrating an example process for wireless communication that supports enhanced bandwidth puncturing according to some implementations.

FIG. 11B shows a flowchart illustrating an example process 1110 for wireless communication that supports enhanced bandwidth puncturing according to some implementations. In some other implementations, the process 1110 may be performed by a wireless communication device operating as or within a STA such as one of the STAs 104 or 504 of FIGS. 1 and 5B, respectively.

With reference for example to FIG. 11A, the process 1110 may begin, in block 1112, after the reception of the management frame in block 1102 and before the communication with the AP in block 1104. In some implementations, the process 1110 begins in block 1112 by performing a CCA operation that indicates one or more second punctured subchannels that are different than the one or more first punctured subchannels. In block 1114, the process 1110 proceeds with transmitting, to the AP, a packet carrying dynamic punctured channel information indicating the one or more second punctured subchannels, where the portion of the wireless channel further excludes the one or more second punctured subchannels.

In some aspects, the packet may be a PPDU and the dynamic punctured channel information may be carried in a U-SIG field of the PPDU. In some other aspects, the packet may be a control frame and the dynamic punctured channel information may be carried in a service field of the control frame. In some implementations, the dynamic punctured channel information may include a bitmap representing a plurality of subchannels of the wireless channel, where the one or more second punctured subchannels are indicated by one or more bits, respectively, of the bitmap. In some other implementations, the dynamic punctured channel information may be carried on five bits of the service field having a value that maps to the one or more first punctured subchannels.

Figure 12:
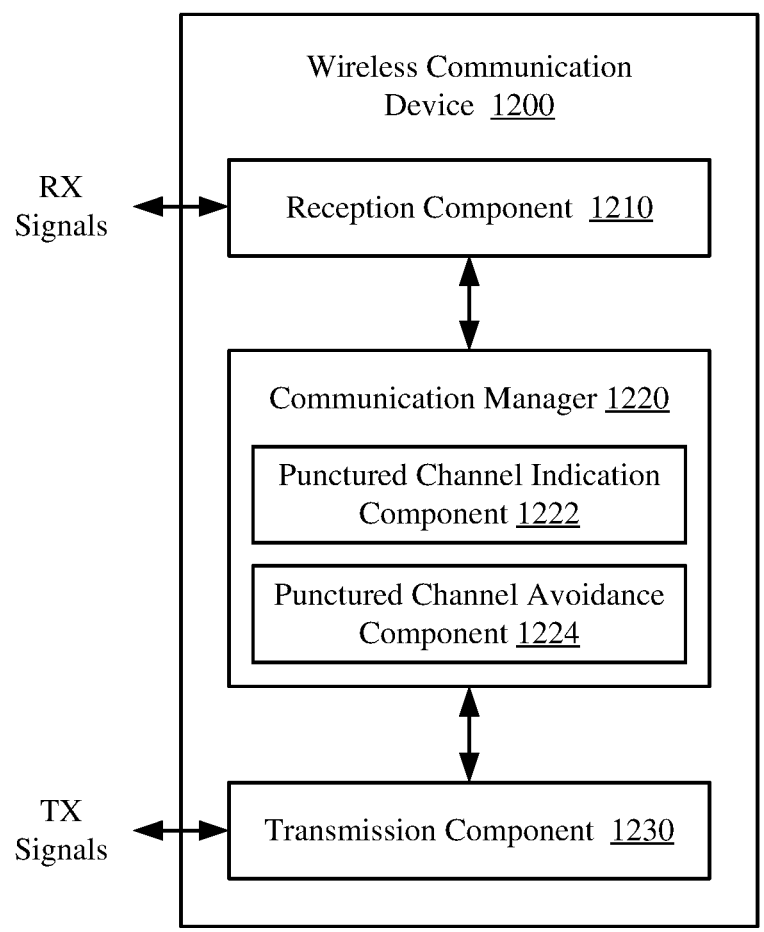
FIG. 12 shows a block diagram of an example wireless communication device according to some implementations.

FIG. 12 shows a block diagram of an example wireless communication device 1200 according to some implementations. In some implementations, the wireless communication device 1200 is configured to perform any of the processes 1000 or 1010 described above with reference to FIGS. 10A and 10B, respectively. In some implementations, the wireless communication device 1200 can be an example implementation of the wireless communication device 400 described above with reference to FIG. 4. For example, the wireless communication device 1200 can be a chip, SoC, chipset, package or device that includes at least one processor and at least one modem (for example, a Wi-Fi (IEEE 802.11) modem or a cellular modem).

The wireless communication device 1200 includes a reception component 1210, a communication manager 1220, and a transmission component 1230. The communication manager 1220 may further include a punctured channel indication component 1222 and punctured channel avoidance component 1224. Portions of one or more of the components 1222 and 1224 may be implemented at least in part in hardware or firmware. In some implementations, at least one of the components 1222 or 1224 is implemented at least in part as software stored in a memory (such as the memory 408). For example, portions of one or more of the components 1222 and 1224 can be implemented as non-transitory instructions or code executable by a processor (such as the processor 406) to perform the functions or operations of the respective component.

The reception component 1210 is configured to receive RX signals, over a wireless channel, from one or more other wireless communication devices; the transmission component 1230 is configured to transmit TX signals, over the wireless channel, to the one or more other wireless communication devices; and the communication manager 1220 is configured to manage communications with the one or more other wireless communication devices. In some implementations, the punctured channel indication component 1222 transmits, to a STA, a management frame carrying punctured channel information indicating one or more punctured subchannels associated with a wireless channel; and the punctured channel avoidance component 1224 communicates with the STA over a portion of the wireless channel that excludes at least the one or more punctured subchannels.

Figure 13:
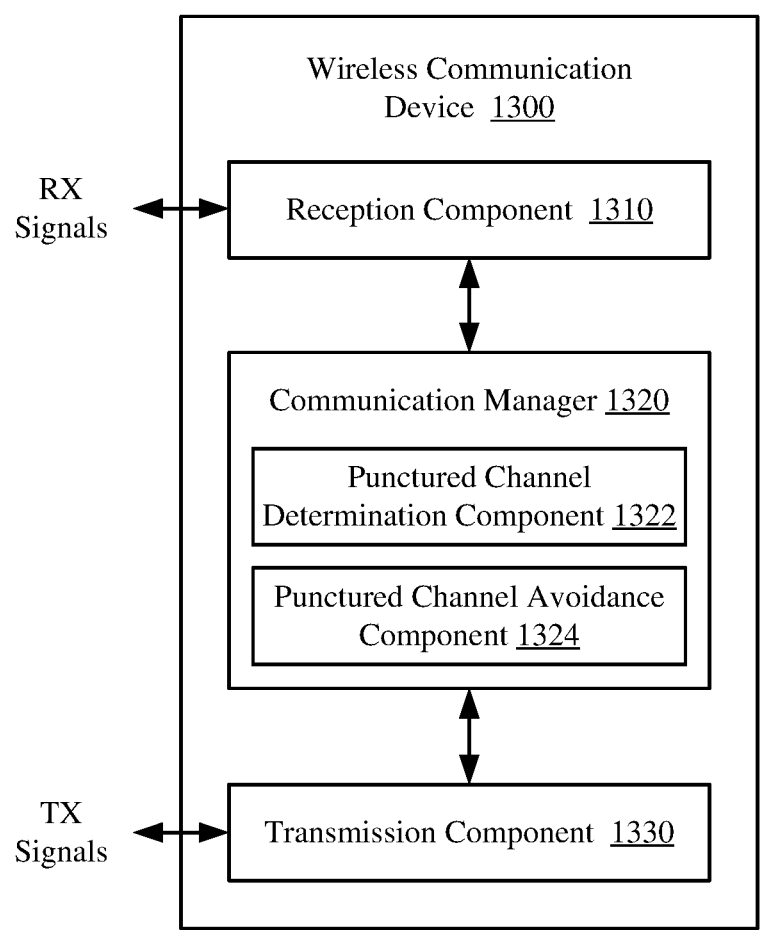
FIG. 13 shows a block diagram of an example wireless communication device according to some implementations.

FIG. 13 shows a block diagram of an example wireless communication device 1300 according to some implementations. In some implementations, the wireless communication device 1300 is configured to perform any of the processes 1100 or 1110 described above with reference to FIGS. 11A and 11B, respectively. In some implementations, the wireless communication device 1300 can be an example implementation of the wireless communication device 400 described above with reference to FIG. 4. For example, the wireless communication device 1300 can be a chip, SoC, chipset, package or device that includes at least one processor and at least one modem (for example, a Wi-Fi (IEEE 802.11) modem or a cellular modem).

The wireless communication device 1300 includes a reception component 1310, a communication manager 1320, and a transmission component 1330. The communication manager 1320 may further include a punctured channel determination component 1322 and punctured channel avoidance component 1324. Portions of one or more of the components 1322 and 1324 may be implemented at least in part in hardware or firmware. In some implementations, at least one of the components 1322 or 1324 is implemented at least in part as software stored in a memory (such as the memory 408). For example, portions of one or more of the components 1322 and 1324 can be implemented as non-transitory instructions or code executable by a processor (such as the processor 406) to perform the functions or operations of the respective component.

The reception component 1310 is configured to receive RX signals, over a wireless channel, from one or more other wireless communication devices; the transmission component 1330 is configured to transmit TX signals, over the wireless channel, to the one or more other wireless communication devices; and the communication manager 1320 is configured to manage communications with the one or more other wireless communication devices. In some implementations, the punctured channel determination component 1322 receives, from an AP, a management frame carrying punctured channel information indicating one or more first punctured subchannels associated with a wireless channel; and the punctured channel avoidance component 1324 communicates with the AP over a portion of the wireless channel that excludes at least the one or more first punctured subchannels.

Implementation examples are described in the following numbered clauses:

1. A method for wireless communication by a wireless communication device, including:
   transmitting, to a wireless station (STA), a management frame carrying punctured channel information indicating one or more first punctured subchannels associated with a wireless channel; and communicating with the STA over a portion of the wireless channel that excludes at least the one or more first punctured subchannels.
2. The method of clause 1, where the punctured channel information includes a bitmap representing a plurality of subchannels associated with the wireless channel, the one or more first punctured subchannels being indicated by one or more bits, respectively, of the bitmap.
3. The method of any of clauses 1 or 2, where each bit of the bitmap represents a respective 20 MHz subchannel.
4. The method of any of clauses 1-3, where the bitmap is carried in a non-legacy operation element of the management frame.
5. The method of any of clauses 1-4, where the punctured channel information includes a puncturing mode indication indicating whether a transmit opportunity (TXOP) holder is permitted to indicate one or more second punctured subchannels to a TXOP responder, the one or more second punctured subchannels being different than the one or more first punctured subchannels.
6. The method of any of clauses 1-5, where the puncturing mode indication further indicates whether the TXOP responder is permitted to indicate one or more third punctured subchannels to the TXOP holder, the third punctured subchannels being different than the first punctured subchannels and the second punctured subchannels.
7. The method of any of clauses 1-6, where the puncturing mode indication is carried in a non-legacy capability element of the management frame.
8. The method of any of clauses 1-7, further including:
receiving, from the STA, a packet carrying dynamic punctured channel information indicating one or more second punctured subchannels that are different than the one or more first punctured subchannels, the portion of the wireless channel further excluding the one or more second punctured subchannels.
9. The method of any of clauses 1-8, further including:
performing a clear channel assessment (CCA) operation that indicates one or more second punctured subchannels that are different than the one or more first punctured subchannels; and
transmitting, to the STA, a packet carrying dynamic punctured channel information indicating the one or more second punctured subchannels, the portion of the wireless channel further excluding the one or more second punctured subchannels.
10. The method of any of clauses 1-9, where the packet is a physical layer convergence protocol (PLCP) protocol data unit (PPDU) and the dynamic punctured channel information is carried in a universal signal field (U-SIG) of the PPDU.
11. The method of any of clauses 1-9, where the packet is a control frame and the dynamic punctured channel information is carried in a service field of the control frame.
12. The method of any of clauses 1-9 or 11, where the dynamic punctured channel information includes a bitmap representing a plurality of subchannels of the wireless channel, the one or more second punctured subchannels being indicated by one or more bits, respectively, of the bitmap.
13. The method of any of clauses 1-9 or 11, where the dynamic punctured channel information is carried on five bits of the service field having a value that maps to the one or more first punctured subchannels.
14. A wireless communication device including:
at least one processor; and
at least one memory communicatively coupled with the at least one processor and storing processor-readable code that, when executed by the at least one processor, is configured to perform the method of any one or more of clauses 1-13.
15. A method for wireless communication by a wireless communication device including:
receiving, from an access point (AP), a management frame carrying punctured channel information indicating one or more first punctured subchannels associated with a wireless channel; and communicating with the AP over a portion of the wireless channel that excludes at least the one or more first punctured subchannels.
16. The method of clause 15, where the punctured channel information includes a bitmap representing a plurality of subchannels associated with the wireless channel, the one or more first punctured subchannels being indicated by one or more bits, respectively, of the bitmap.
17. The method of any of clauses 15 or 16, where each bit of the bitmap represents a respective 20 MHz subchannel.
18. The method of any of clauses 15-17, where the bitmap is carried in a non-legacy operation element of the management frame.
19. The method of any of clauses 15-18, where the punctured channel information includes a puncturing mode indication indicating whether a transmit opportunity (TXOP) holder is permitted to indicate one or more second punctured subchannels to a TXOP responder, the one or more second punctured subchannels being different than the one or more first punctured subchannels.
20. The method of any of clauses 15-19, where the puncturing mode indication further indicates whether the TXOP responder is permitted to indicate one or more third punctured subchannels to the TXOP holder, the third punctured subchannels being different than the first punctured subchannels and the second punctured subchannels.
21. The method of any of clauses 15-20, where the puncturing mode indication is carried in a non-legacy capability element of the management frame.
22. The method of any of clauses 15-21, further including:
receiving, from the AP, a packet carrying dynamic punctured channel information indicating one or more second punctured subchannels that are different than the one or more first punctured subchannels, the portion of the wireless channel further excluding the one or more second punctured subchannels.
23. The method of any of clauses 15-22, further including:
performing a clear channel assessment (CCA) operation that indicates one or more second punctured subchannels that are different than the one or more first punctured subchannels; and
transmitting, to the AP, a packet carrying dynamic punctured channel information indicating the one or more second punctured subchannels, the portion of the wireless channel further excluding the one or more second punctured subchannels.
24. The method of any of clauses 15-23, where the packet is a physical layer convergence protocol (PLCP) protocol data unit (PPDU) and the dynamic punctured channel information is carried in a universal signal field (U-SIG) of the PPDU.

25. The method of any of clauses 15-23, where the packet is a control frame and the dynamic punctured channel information is carried in a service field of the control frame.

26. The method of any of clauses 15-23 or 25, where the dynamic punctured channel information includes a bitmap representing a plurality of subchannels of the wireless channel, the one or more second punctured subchannels being indicated by one or more bits, respectively, of the bitmap.

27. The method of any of clauses 15-23 or 25, where the dynamic punctured channel information is carried on five bits of the service field having a value that maps to the one or more first punctured subchannels.

28. A wireless communication device including:
at least one processor; and
at least one memory communicatively coupled with the at least one processor and storing processor-readable code that, when executed by the at least one processor, is configured to perform the method of any one or more of clauses 15-27.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method for wireless communication by a wireless communication device comprising:
    transmitting, to a wireless station (STA), a management frame including an operation element, the operation element including:
        a bit indicating whether the operation element omits octets that indicate a bitmap associated with punctured channel information; and
        the octets that indicate the bitmap associated with the punctured channel information in accordance with the bit indicating that the operation element carries the octets, the punctured channel information indicating one or more first punctured subchannels associated with a wireless channel; and
    communicating with the STA over a portion of the wireless channel that excludes at least the one or more first punctured subchannels.

2. The method of claim 1, wherein the bitmap represents a plurality of subchannels associated with the wireless channel, the one or more first punctured subchannels being indicated by one or more bits, respectively, of the bitmap.

3. The method of claim 2, wherein the bitmap is a 16-bit bitmap and each bit of the bitmap represents a respective 20 MHz subchannel, a first bit value of that bit indicating that the respective 20 MHz subchannel is punctured and a second bit value of that bit indicating that the respective 20 MHz subchannel is not punctured.

4. The method of claim 1, wherein the operation element is an Extremely High Throughput (EHT) operation element.

5. The method of claim 1, wherein the punctured channel information includes a puncturing mode indication indicating whether a transmit opportunity (TXOP) holder is permitted to indicate one or more second punctured subchannels to a TXOP responder, the one or more second punctured subchannels being different than the one or more first punctured subchannels.

6. The method of claim 5, wherein the puncturing mode indication further indicates whether the TXOP responder is permitted to indicate one or more third punctured subchannels to the TXOP holder, the one or more third punctured subchannels being different than the one or more first punctured subchannels and the one or more second punctured sub channels.

7. The method of claim 5, wherein the puncturing mode indication is carried in a non-legacy capability element of the management frame.

8. The method of claim 1, further comprising:
receiving, from the STA, a packet carrying dynamic punctured channel information indicating one or more second punctured subchannels that are different than the one or more first punctured subchannels, the portion of the wireless channel further excluding the one or more second punctured subchannels.

9. The method of claim 1, further comprising:
performing a clear channel assessment (CCA) operation that indicates one or more second punctured subchannels that are different than the one or more first punctured subchannels; and
transmitting, to the STA, a packet carrying dynamic punctured channel information indicating the one or more second punctured subchannels, the portion of the wireless channel further excluding the one or more second punctured subchannels.

10. The method of claim 9, wherein the packet comprises a physical layer convergence protocol (PLCP) protocol data unit (PPDU) and the dynamic punctured channel information is carried in a universal signal field (U-SIG) of the PPDU.

11. The method of claim 9, wherein the packet comprises a control frame and the dynamic punctured channel information is carried in a service field of the control frame.

12. The method of claim 11, wherein the dynamic punctured channel information includes a second bitmap representing a plurality of subchannels of the wireless channel, the one or more second punctured subchannels being indicated by one or more bits, respectively, of the bitmap.

13. The method of claim 11, wherein the dynamic punctured channel information is carried on five bits of the service field having a value that maps to the one or more first punctured sub channels.

14. A wireless communication device comprising:
at least one processor; and
at least one memory communicatively coupled with the at least one processor and storing processor-readable code that, when executed by the at least one processor, is configured to:
transmit, to a wireless station (STA), a management frame including an operation element, the operation element including:
a bit indicating whether the operation element omits octets that indicate a bitmap associated with punctured channel information; and
the octets that indicate the bitmap associated with the punctured channel information in accordance with the bit indicating that the operation element carries the octets, the punctured channel information indicating one or more first punctured subchannels associated with a wireless channel; and
communicate with the STA over a portion of the wireless channel that excludes at least the one or more first punctured subchannels.

15. The wireless communication device of claim 14, wherein the bitmap represents a plurality of subchannels associated with the wireless channel, the one or more first punctured subchannels being indicated by one or more bits, respectively, of the bitmap.

16. A method for wireless communication by a wireless communication device comprising:
receiving, from an access point (AP), a management frame including an operation element, the operation element including:
a bit indicating whether the operation element omits octets that indicate a bitmap associated with punctured channel information; and
the octets that indicate the bitmap associated with the punctured channel information in accordance with the bit indicating that the operation element carries the octets, the punctured channel information indicating one or more first punctured subchannels associated with a wireless channel; and
communicating with the AP over a portion of the wireless channel that excludes at least the one or more first punctured subchannels.

17. The method of claim 16, wherein the bitmap represents a plurality of subchannels associated with the wireless channel, the one or more first punctured subchannels being indicated by one or more bits, respectively, of the bitmap.

18. The method of claim 17, wherein the bitmap is a 16-bit bitmap and each bit of the bitmap represents a respective 20 MHz subchannel, a first bit value of that bit indicating that the respective 20 MHz subchannel is punctured and a second bit value of that bit indicating that the respective 20 MHz subchannel is not punctured.

19. The method of claim 16, wherein the operation element is an Extremely High Throughput (EHT) operation element.

20. The method of claim 16, wherein the punctured channel information includes a puncturing mode indication indicating whether a transmit opportunity (TXOP) holder is permitted to indicate one or more second punctured subchannels to a TXOP responder, the one or more second punctured subchannels being different than the one or more first punctured subchannels.

21. The method of claim 20, wherein the puncturing mode indication further indicates whether the TXOP responder is permitted to indicate one or more third punctured subchannels to the TXOP holder, the one or more third punctured subchannels being different than the one or more first punctured subchannels and the one or more second punctured sub channels.

22. The method of claim 20, wherein the puncturing mode indication is carried in a non-legacy capability element of the management frame.

23. The method of claim 16, further comprising:
receiving, from the AP, a packet carrying dynamic punctured channel information indicating one or more second punctured subchannels that are different than the one or more first punctured subchannels, the portion of the wireless channel further excluding the one or more second punctured subchannels.

24. The method of claim 16, further comprising:
performing a clear channel assessment (CCA) operation that indicates one or more second punctured subchannels that are different than the one or more first punctured subchannels; and
transmitting, to the AP, a packet carrying dynamic punctured channel information indicating the one or more second punctured subchannels, the portion of the wireless channel further excluding the one or more second punctured subchannels.

25. The method of claim 24, wherein the packet comprises a physical layer convergence protocol (PLCP) protocol data unit (PPDU) and the dynamic punctured channel information is carried in a universal signal field (U-SIG) of the PPDU.

26. The method of claim 25, wherein the packet comprises a control frame and the dynamic punctured channel information is carried in a service field of the control frame.

27. The method of claim 26, wherein the dynamic punctured channel information includes a second bitmap representing a plurality of subchannels of the wireless channel, the one or more second punctured subchannels being indicated by one or more bits, respectively, of the bitmap.

28. The method of claim 26, wherein the dynamic punctured channel information is carried on five bits of the service field having a value that maps to the one or more first punctured sub channels.

29. A wireless communication device comprising:
  at least one processor; and
  at least one memory communicatively coupled with the at least one processor and storing processor-readable code that, when executed by the at least one processor, is configured to:
    receive, from an access point (AP), a management frame including an operation element, the operation element including:
      a bit indicating whether the operation element omits octets that indicate a bitmap associated with punctured channel information; and
      the octets that indicate the bitmap associated with the punctured channel information in accordance with the bit indicating that the operation element carries the octets, the punctured channel information indicating one or more first punctured subchannels associated with a wireless channel; and
    communicate with the AP over a portion of the wireless channel that excludes at least the one or more first punctured subchannels.

30. The wireless communication device of claim 29, wherein the bitmap represents a plurality of subchannels associated with the wireless channel, the one or more first punctured subchannels being indicated by one or more bits, respectively, of the bitmap.

* * * * *